(12) United States Patent
Chang

(10) Patent No.: US 6,577,748 B2
(45) Date of Patent: Jun. 10, 2003

(54) ENCODING AND RECORDING A MESSAGE WITHIN AN IMAGE

(76) Inventor: Kenneth H. P. Chang, 1106 Blythe St., Foster City, CA (US) 94404

( * ) Notice: Subject to any disclaimer, the term of this patent is extended or adjusted under 35 U.S.C. 154(b) by 0 days.

(21) Appl. No.: 09/844,882

(22) Filed: Apr. 28, 2001

(65) Prior Publication Data

US 2001/0017932 A1 Aug. 30, 2001

Related U.S. Application Data

(63) Continuation of application No. 09/138,591, filed on Aug. 22, 1998.

(51) Int. Cl.7 .................................................. G06K 9/00
(52) U.S. Cl. ....................................... 382/100; 713/176
(58) Field of Search ................................ 382/100, 232, 382/270, 317, 287; 707/514, 529; 235/454, 456, 462, 494; 203/93, 114, 117; 713/176

(56) References Cited

U.S. PATENT DOCUMENTS

| | | |
|---|---|---|
| 4,263,504 A | 4/1981 | Thomas |
| 4,939,354 A | 7/1990 | Priddy et al. |
| 5,128,525 A | 7/1992 | Stearns et al. |
| 5,189,292 A | 2/1993 | Batterman et al. |
| 5,245,165 A | 9/1993 | Zhang |
| 5,278,400 A | 1/1994 | Appel |
| 5,329,107 A | 7/1994 | Priddy et al. |
| 5,343,031 A | 8/1994 | Yoshida |
| 5,507,527 A | 4/1996 | Tomioka et al. |
| 5,515,447 A | 5/1996 | Zheng et al. |
| 5,521,372 A  * | 5/1996 | Hecht et al. ................. 235/494 |
| 5,541,396 A | 7/1996 | Rentsch |
| 5,572,010 A | 11/1996 | Petrie |
| 5,576,532 A | 11/1996 | Hecht |
| 5,591,956 A | 1/1997 | Longacre, Jr. et al. |
| 5,633,489 A | 5/1997 | Dvorkis et al. |
| 5,646,997 A | 7/1997 | Barton |
| 5,748,763 A  * | 5/1998 | Rhoads ........................ 382/115 |
| 5,748,783 A | 5/1998 | Rhoads |
| 5,761,686 A  * | 6/1998 | Bloomberg ................. 707/529 |
| 5,765,176 A | 6/1998 | Bloomberg |
| 5,771,245 A | 6/1998 | Zhang |
| 5,841,978 A | 11/1998 | Rhoads |
| 5,850,481 A  * | 12/1998 | Rhoads ........................ 382/232 |
| 5,905,248 A  * | 5/1999 | Russel et al. ............... 235/462 |
| 5,956,419 A | 9/1999 | Kopec et al. |
| 5,966,637 A | 10/1999 | Kanungo et al. |
| 6,076,738 A | 6/2000 | Bloomberg et al. |

FOREIGN PATENT DOCUMENTS

| | | |
|---|---|---|
| EP | 0777197 | 6/1997 |
| WO | WO 97/32262 | 9/1997 |

* cited by examiner

*Primary Examiner*—Jayanti K. Patel
*Assistant Examiner*—Abolfazl Tabatabai

(57) ABSTRACT

A method for decoding a message embedded in a pattern of pixels. The method includes the steps of determining the pixel values for pixels from the pattern of pixels, determining binary values from the pixel values for pixels from the pattern of pixels; and determining the embedded message from the binary values. The pixels have a range of pixel values between a maximum and a minimum. The pixels are divided into cells each having glyph cell and background pixels. The binary value of a glyph pixel is determined by the contrast the glyph pixel has with its background pixels. The method can be used to decode embedded web-site address from an image with a foreground image and the embedded web-site address.

15 Claims, 22 Drawing Sheets

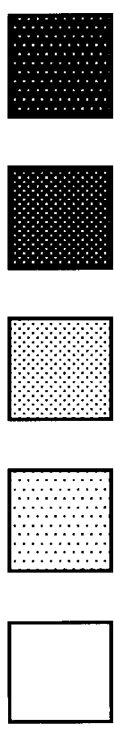

FIG. 6A FIG. 6B FIG. 6C FIG. 6D
FIG. 6E FIG. 6F FIG. 6G FIG. 6H
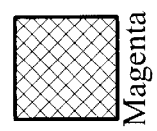 Magenta
 Yellow
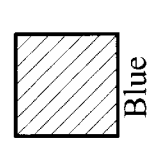 Cyanic
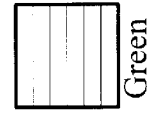 Blue
 Green
Red
FIG. 6I

| s1 | s2 | s3 | s4 | s5 | s6 | s7 | s8 | s9 | s10 | s11 | s12 | s13 |
|---|---|---|---|---|---|---|---|---|---|---|---|---|
| d1 | d3 | d7 | d10 | d13 | d16 | d19 | d22 | d25 | d28 | d31 | d34 | d37 |
| d2 | d5 | d8 | d11 | d14 | d17 | d20 | d23' | d26 | d29 | d32 | d35 | d38 |
| d4 | d6 | d9 | d12 | d15 | d18 | d21 | d24 | d27 | d30 | d33 | d36 | d39 |
| s14 | s15 | s16 | s17 | s18 | s19 | s20 | s21 | s22 | s23 | s24 | s25 | s26 |
| d40 | d44 | d47 | d50 | d53' | d56 | d59 | d62 | d65 | d68 | d71 | d74 | d77 |
| d41 | d43 | d46 | d49 | d52 | d55 | d58 | d61 | d64 | d67 | d70 | d73 | d76 |
| d42 | d45 | d48 | d51 | d54 | d57 | d60 | d63 | d66 | d69 | d72 | d75 | d78 |
| s27 | s28 | s29 | s30 | s31 | s32 | x | s32' | s31' | s30' | s29' | s28' | s27' |
| d77 | d81 | d84 | d87 | d90 | d93 | d96 | d99 | d102 | d105 | d108 | d111 | d114 |
| d79 | d80 | d83 | d86 | d89 | d92 | d95 | d98 | d101 | d104 | d107 | d110 | d113 |
| d78 | d82 | d85 | d88 | d91 | d94 | d97 | d100 | d103 | d106 | d109 | d112 | d115 |
| s26' | s25' | s24' | s23' | s22' | s21' | s20' | s19' | s18' | s17' | s16' | s15' | s14' |
| d119' | d120 | d123 | d126 | d129 | d132 | d135 | d138 | d141 | d144 | d147 | d150 | d153 |
| d117 | d118 | d122 | d125 | d128 | d131 | d134 | d137 | d140 | d143 | d146 | d149 | d152 |
| d116 | d121 | d124 | d127 | d130 | d133 | d136 | d139 | d142 | d145 | d148 | d151 | d154 |
| s13' | s12' | s11' | s10' | s9' | s8' | s7' | s6' | s5' | s4' | s3' | s2' | s1' |
| d158 | d159 | d162 | d165 | d168 | d171 | d174 | d177 | d180 | d183 | d186 | d189 | d192 |
| d155 | d160 | d163 | d166 | d169 | d172 | d175 | d178 | d181 | d184 | d187 | d190 | d191 |
| d157 | d161 | d164 | d167 | d170 | d173 | d176 | d179 | d182 | d185 | d188 | p | |
| d156 |  |  |  |  |  |  |  |  |  |  |  |  |

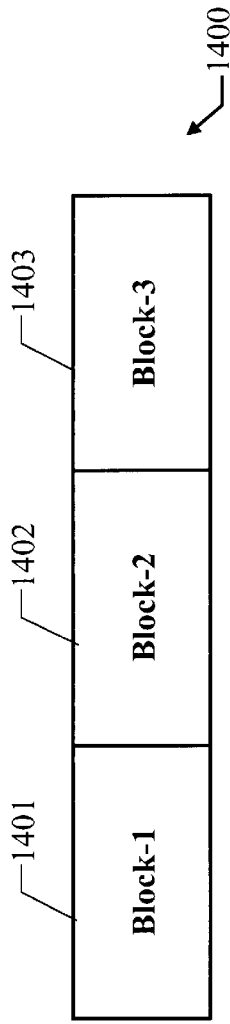
FIG. 14A
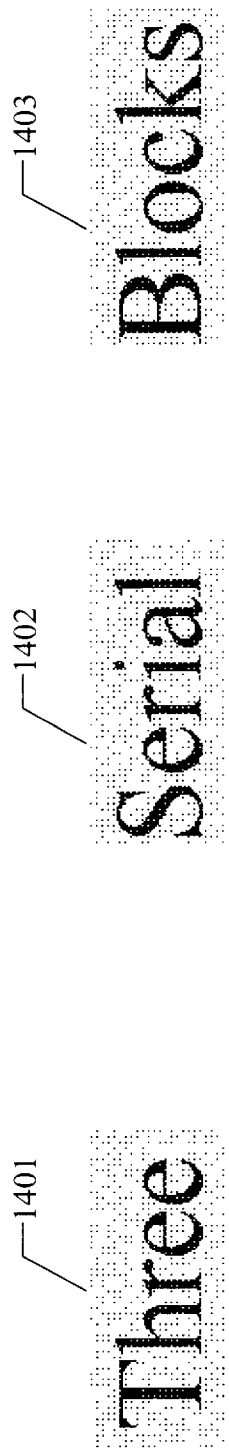
FIG. 14B
FIG. 14C
FIG. 14D
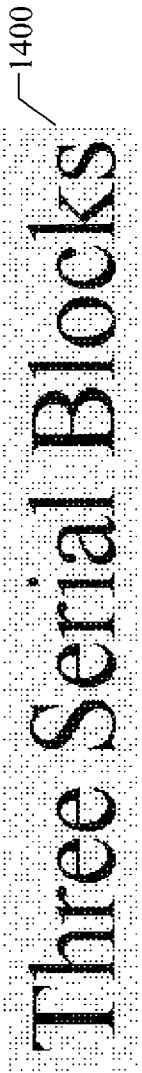
FIG. 14E

```
<HTML>
<BODY>
<P><A HREF="http://www.netshopper.com/"><B><FONT
FACE="Garamond" SIZE=6>Net Shopper</B></FONT></A></P>
<P><A HREF="http://www.netshopper.com/computers.html"><FONT
SIZE=5>Computers</FONT></A> </P>
<P><A HREF="http://www.netshopper.com/monitors.html"><FONT
SIZE=5>Monitors</FONT></A> </P>
<P><A HREF="http://www.netshopper.com/printers.html"><FONT
SIZE=5>Printers</FONT></A></P></BODY>
</HTML>
```
— 1500

FIG. 15

Net Shopper
Computers
Monitors
Printers

Net Shopper — 1506
Computers — 1508
Monitors — 1510
Printers — 1512

ENCODING AND RECORDING A MESSAGE WITHIN AN IMAGE

RELATED APPLICATION

This is a continuation application of patent application Ser. No. 09/138,591, which was filed on Aug. 22, 1998 and hereby incorporated by reference in its entirety.

FIELD OF THE INVENTION

The present invention relates to techniques for encoding and decoding messages, and more particularly to techniques for encoding a message in an image in which the message is not decodable by visual inspection.

BACKGROUND

Having machine-readable code on the packaging of a product is a good way to transmit information related to the product. For example, bar code has been used for many years to carry information such as product identification and inventory information. Such bar codes can be optically read to retrieve the information encoded in the bar codes.

However, bar codes are one dimensional and are limited in the amount of information that can be stored. As a result, two dimensional symbology has been developed to increase the amount of data stored by such codes. In using two dimensional codes for recording information, precise synchronization is needed to read the data from the symbol pattern sequentially. To provide orientation for the two dimensional symbology, the techniques of encoding often need visually identifiable features such as lines, frames, concentric rings, axes, columns or rows of symbols, or the like, that are optically discriminatable from other symbols and images. Unfortunately, such techniques are less than desirable if the information is to be embedded in a visual image because the visually identifiable features are obtrusive to a viewer who wants to observe the image without distraction.

What is needed is a technique for encoding and decoding embedded messages within a visual image without obtrusive features representing the embedded message or the synchronization or orientation of the data pattern.

U.S. Pat. Nos. 4,263,504 (Thomas), 5,189,292 (Batterman et al), 5,128,525 (Stearns et al.) 5,221,833 (Hecht). 5,45,165 (Zhang), 5,329,107 (Priddy et al.). 5,439,354 (Priddy). 5,481,103 (Wang), 5,507,527 (Tomioka, et al.). 5,515,447 (Zheng, et al). 5,521,372 (Hecht, et al.), 5,541,396 (Rentsch), 5,572,010 (Petrie). 5,576,532 (Hecht), and 5,591,956 (Longacre, et al.) are examples of descriptions of the use of two dimensional symbology in storing encoded information. The disclosure of these cited patents are incorporated by reference herein in their entirety.

SUMMARY

This invention provides techniques for decoding a message embedded in a pattern of pixels. The technique includes determining the pixel values for pixels from the pattern of pixels; determining binary values from the pixel values for pixels from the pattern of pixels; and determining the embedded message from the binary values. In another aspect, the present invention provides a device to encode an image with a foreground image having an embedded message and also provides a device for decoding the image for the embedded message.

The invention of the present invention can be advantageously applied in coding and decoding messages in a foreground image without resulting in obtrusive changes in the image that might overly distract a viewer from visually recognizing the foreground image. An example is loading a URL address (that has been embedded in a visual image) into a web browser. At the present, when a person "surfs the net" and comes across a "hotspot" (which is often a photographic display or blue words) hyperlinked to another web site, the person would simply use the pointing device (a mouse) and click at the hotspot to move onto the web site of that hotspot. There is, however, no simple way to print out the displayed image and later use that image to input the URL address of the web site to direct a web browser to connect to the web site. The present technique provides a process, as well as a device to enable a web site to be printed to retain the visual image, yet allowing an electronic reader to read the image and direct the web browser to connect to that web site. The process includes receiving light from a display showing a pattern of pixels and determining pixel value of each pixel: recovering an embedded URL address by determining binary values from the pixel values for pixels; and loading the URL address into the web browser for connecting to the web site according to the URL address. The present invention can use grayscale images or multi-colored images for communicating embedded messages in images. Thus, on a visual level, images and words can be displayed for a human to appreciate and read, yet on a less obvious level, a message embedded in the image can be read by a machine. The image, with the embedded message, when expressed in a printed form, can be taken from place to place conveniently.

BRIEF DESCRIPTION OF THE DRAWINGS

The following figures are included to better illustrate the embodiments of the apparatus and technique of the present invention. In these figures, like numerals represent like features in the several views.

FIGS. 4A to 4I show embodiments of how pixels of cells encode logical "1."

FIGS. 6A to 6I show embodiments of how pixels of color cells encode logical "1" and "0."

FIG. 11 shows an embodiment with single layer data block cell layout and symmetric data cells.

FIG. 12A shows an embodiment of a double layer data block cell layout with symmetric sync cells, and symmetric data cells.

FIG. 12B shows a forward sync stream with block tag and error correction code and FIG. 12C shows a backward sync stream which is a mirror image of the forward sync stream of FIG. 12B.

FIG. 12D shows a forward data stream with message data and error correction code and FIG. 12E shows a backward data stream which is a mirror image of the forward sync stream of FIG. 12D.

FIG. 13 shows an embodiment of double layer data block cell layout with symmetric sync cells, and asymmetric data cells.

FIG. 14A illustrated schematically an embodiment of an image derived from serial blocks.

FIGS. 14B to 14D illustrate the serial blocks for the image of FIG. 14A.

FIG. 14E shows the resulting block that consists of the serial block of FIGS. 14B to 14D.

FIG. 15 shows an example of the codes of a HTML page.

FIG. 16 shows the appearance of typical conventional "hotspots" for the web sites of that HTML page of FIG. 15.

FIG. 17 shows the appearance of an image with embedded URL sites "hotspots" for the web sites of that HTML page of FIG. 15.

FIG. 18 shows a self-symmetry double-layered, sync symmetric and data symmetric data map.

DETAILED DESCRIPTION

In one aspect of the invention the present invention provides a technique to embed a message in a visual image without obtrusive features that draw attention from the visual image. An example of such is embedding a hyperlink address such as a URL address ("web-site address") in an image printed on paper.

As a first illustration, an embodiment of a single color (or grayscale) image with an embedded message is described in detail below. However, a person skilled in the art will be able to adapt the techniques of present disclosure readily for detailed implementation for colored embodiments. For a single color (e.g., black-gray-white) with a grayscale image, the pixels have gray values that range from a minimum pixel value (e.g., representing black) to a maximum pixel value (e.g., representing white). Likewise, in colored embodiments of other non-black-white colors, ranges of shades of colors can be similarly implemented.

Single Color Image

To better illustrate the present invention using a black-white grayscale embodiment, the following values are adopted. It is to be understood that other values (e.g., color, sizes, dimensions, values, and the like) can be similarly adopted by one skilled in the art.

Figure 1:
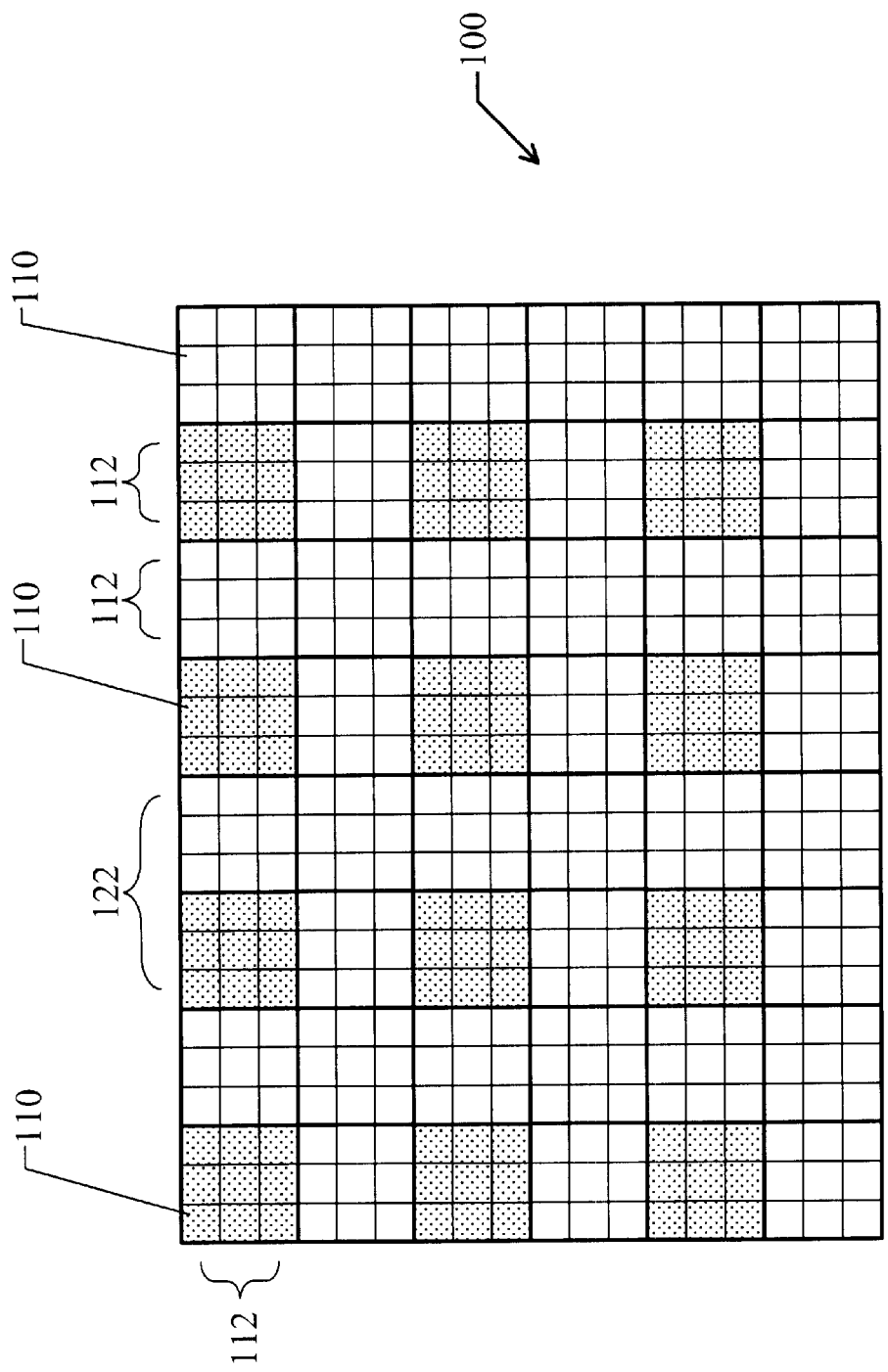
FIG. 1 shows an embodiment of a grayscale representation of a block of cells of pixels.
Figure 2:
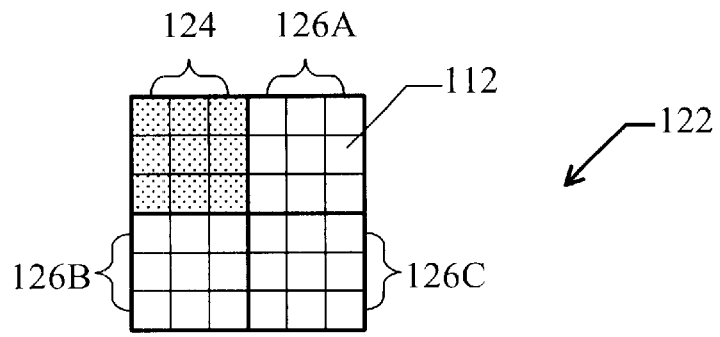
FIG. 2 shows an embodiment of a tile having four cells of pixels.
Figure 3A:
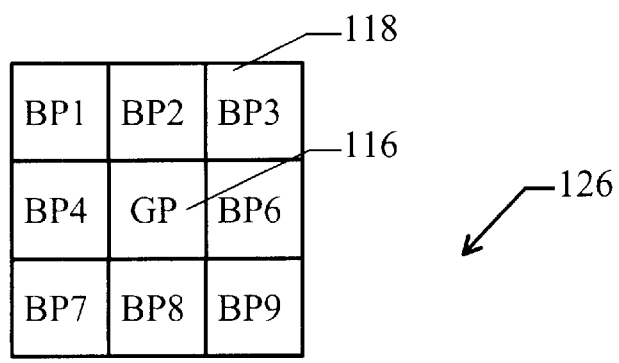
FIG. 3A shows a cell with 3×3 pixels.

FIG. 1 shows an embodiment of a grayscale representation of a block 100 of cells 112 of pixels. The cells are divided into two dimensional groups, called "tiles" 122. The encoded information in an image is represented by symbols, or glyphs, which in the black-white embodiment are represented by pixels 110. To convey logical information, the pixels 110 are divided in glyph cells (or simply "cells" herein after) 112, each of which is a square (n×n) array to convey one binary bit value. A person skilled in the art will know that more than one cell can be used to convey one binary bit by having each cell representing a component or fraction of a bit. Examples include determining the bit as a whole from the sum, the average, the maximum, the contrast, similarity, or the like among two or more number of cells. However, for the sake of clarity of description, for this grayscale embodiment, except where it is specifically stated otherwise in context, one cell will only denote one bit. A cell can be a synchronization (sync) cell 124 or a data cell 126 (see FIG. 2). (In FIG. 1 and FIG. 2 the dots in the upper left cell in a tile are included in the figures for assisting the reader of this disclosure to identify the sync cells and do not necessarily denote observable differences.) As can be seen in FIG. 2 and FIG. 3A, among the pixels in a cell 112 (or sync cell 124 or data cell 126), one pixel, the "glyph pixel" (GP pixel) 116 (see FIG. 3A) represents the logical value (i.e. binary value) of the cell, whereas the other pixels (the "background pixels", or "BP pixels") 118 nearby (in this embodiment surrounding the GP) act as the background and facilitates the designation of the primary pixel in encoding as "black." "gray," or "white," depending on the pixel values of all the pixels of the cell. The way the designation is performed will be describe below. There can be various levels of shades of grayness. For illustration, the 3×3 cell will be used for describing the present invention, although one skilled in the art can easily implement other cell sizes (e.g., n=2, 4, 5, etc.) based on the present disclosure. Also, it is not necessary that the cell be a squire. In a 3×3 cell, as shown in FIG. 2 and FIG. 3A, the background pixels are BP1, BP2, BP3, BP4, BP6, BP7, BP8, and BP9.

The logical information in the image are represented by logical binary bit values of 0 and 1. In the pixels that convey the logical information, the contrast between one pixel versus others (i.e., the GP pixel 116 versus the BP pixels 118), e.g., in a cell, represents one bit.

The pixel value of a pixel (whether a GP pixel or a BP pixel) is a gray value between a minimum and a maximum, for convention, denoted as between 0 and 255 (where 0=black, and 255=white).

As shown in an embodiment in FIGS. 1 and 2, the cells 112 are arranged in glyph tiles (or simply "tiles" hereinafter) 122 each containing m×r cells where m and r are whole numbers. For illustration, in this embodiment, a tile contains 2×2 cells. However, it is not necessary that the tile be a square. FIG. 2 shows a tile similar to one in the block 100 shown in FIG. 1. One of the cells in the tile 122 is a sync cell 124 and the rest are data cells 126. The logical value of each cell 112 is represented by the GP pixel's contrast with the BP pixels, and is either a data bit, which represents the message embedded and associated error correction regarding the message, or a synchronization bit (sync bit), which controls the interpretation of the data, for example, designating the length of the message, where the error correction bits are, and the like. Thus, each tile 122 contains one sync cell 124 and (m×r−1) data cells 126. The sync cells 124 provide spatial synchronization to preserve the logical ordering of the data (which are contained in the data cells 126) so that the glyph code can be read and decoded. To this end, the sync cells 124 and the data cells 126 are arranged in a predetermined fashion, e.g., a regularly spaced positions repeating from tile to tile. FIGS. 1 and 2 show the location of sync cell 124 relative to data cells 126 in an embodiment. In this embodiment, from the perspective of the viewer the sync cell 124 is located at the upper left hand corner of a tile which also contain data cells 126A, 126B, and 126C. In this embodiment, for example, data bits are arranged such that the first bit is located in data cell 126A, the second bit in data cell 126B, and the third bit in data cell 126C in the first tile. The next three data bits will be located in the data cells 126A, 126B, 126C of the second tile, and so forth. Minor synchronization errors can be tolerated by providing error correction capability. It is to be understood that such arrangement of sync cell relative to data cells is for illustrative purposes only. Other ways of arrangement are possible. For example, single layer self-symmetry arrangement, as described infra requires no sync cells apart from the data cells.

Encoding Glyph Cells

Figure 3B:
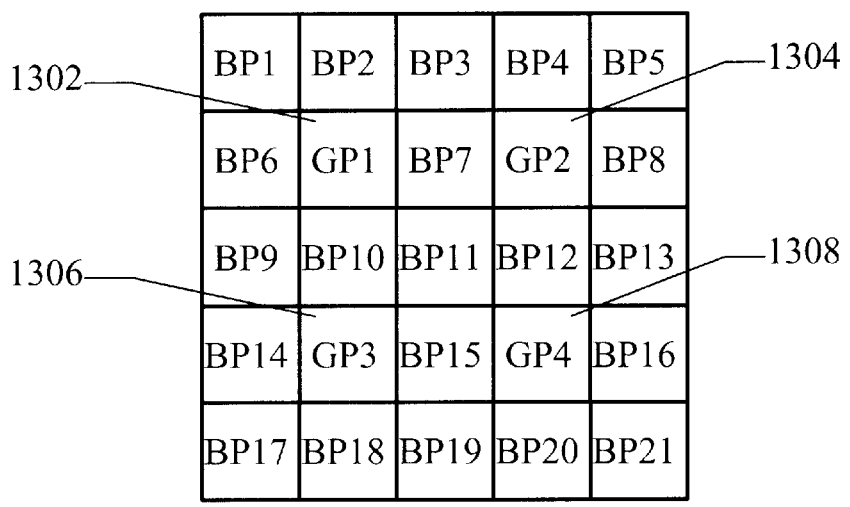
FIG. 3B shows a cell with 5×5 pixels.

In general, there can be m GPs and n BPs in a cell where n is larger then m (FIG. 3B). Each cell has a cell contrast (CC) which is a function of the pixel values of all the pixels of the cell.

$$CC = ABS((GP1+GP2+\ldots+GPm)/m - (BP1+BP2+\ldots+BPn)/n)$$

where in this equation ABS means the absolute function and GP1, GP2 and GPm represent the pixel value of glyph pixels, and BP1, BP2, BPn means the pixel value of background pixels.

For simplicity, as shown in FIG. 3A, in the illustrative 3×3 monotone (i.e. black-white-grayscale) glyph cells, a glyph cell 126 has one central glyph pixel, GP and eight background pixels (BP1, BP2, BP3, BP4, BP6, BP7, BP8, BP9) surrounding the glyph pixel.

$$CC = ABS(GP - (BP1+BP2+BP3+BP4+BP6+BP7+BP8+BP9)/8)$$

where in this equation ABS means the absolute function and GP, BP1, BP2, etc., represent the pixel values of the respective pixels. Black has a pixel value of 0. White has a pixel value of 255. The pixel values, and therefore the cell contrast can vary from 0 to 255. To represent an embedded message, the cell contrast can be changed by changing the value of the GP pixel. The value of background pixels, BP1, BP2 . . . BP9 preferably do not change, thereby keeping low the distortion to the original visual image (foreground image), which determines the pixel values of the background pixels.

To encode a binary bit of "1" one can change the value of the glyph pixel so that the associated cell contrast is large, preferably, the largest possible (preferably keeping the background pixels constant, as stated previously). On the other hand, to encode a digital bit "0" the pixel value of the GP pixel can be changed so that the cell contrast is small, preferably the smallest possible. In this way, the two binary values can be easily distinguished. Furthermore, due to the use of the absolute function, whether the background is dark or light, the binary value can be encoded in the same way. Of course, the choice of encoding a "1" and a "0" in the above-described way is arbitrary. One can just as easily encode the two binary values in the opposite way.

One way to accomplish the above mentioned technique of maximizing cell contrast for a "1" and minimizing a cell contrast for a "0" can be as follows. A cell weight (CW) is calculated from the background pixels pixel values.

To encode logical values, the following steps can be used:

A. Define Encoding Threshold (ET). (Note that ET is independent of glyph cell, glyph tile and glyph block.)

$$ET = (Black+White)/2.$$

ET is the average pixel value of Black (whose pixel value is 0) and White (whose pixel value is 255). Thus ET has a grayscale value of 127.

B. Compute average Cell Weight (CW), for use in background reversal as will be described later for encoding the GP pixel value.

$$CW = (BP1+BP2+BP3+BP4+BP6+BP7+BP8+BP9)/8$$

where, in this equation, BP1 to BP9 each represent the pixel value of the pixel it represents (i.e., the pixel BP1 to BP9, respectively).

C. Compute Glyph Pixel (GP) Value.

To encode GP data logical One (1), the GP is given a pixel that is the "reverse" of the average cell weight. In other words, if the average cell weight is more white than black, then the GP is set to be more black than white, preferably black:

GP=Black when CW>ET or CW=ET
GP=White when CW<ET

Thus, preferably, when a glyph pixel reverses in the pixel value to encode a logical 1, it goes to the extreme pixel value (i.e., the pixel value is either the brightest 255, or the dimmest 0). In this way, the contrast between the pixel value of the glyph pixel and its surrounding after encoding a logical 1 is the largest. Thus, the cell contrast CC after encoding a "1" is the largest possible.

FIG. 4A shows a 3×3 cell before encoding a GP of logical 1 where the background is white. Thus, the background pixels BP1 to BP9 each have a pixel value of 255, as does the GP pixel. FIG. 4I is the legend (key to the grayscale levels) for FIG. 4A to FIG. 4H. FIG. 4B shows the cell after encoding a 1. After encoding, the background pixels BP1 to BP9 continue to have a pixel value of 255, whereas the glyph pixel GP changes from a white to a black and has a pixel value of 0, which is the largest difference possible from the average background. FIG. 4C shows a 3×3 cell before encoding a GP of logical 1 where the background is black (BP1 to BP9 each have a pixel value of 0). FIG. 4D shows the cell of FIG. 4C after encoding a 1. The glyph pixel GP now has a pixel value of 255. FIG. 4E and FIG. 4F respectively show a 3×3 cell before and after encoding a GP of logical 1 where the background contains gray pixels (BP1, BP4 are light gray, BP7 is gray, BP8 and BP9 is dark gray) and black pixels (BP2, BP3, BP6, each is black having pixel value of 0). Thus, the background is more black than white on the average. As a result, the glyph pixel GP changes from a black to white to encode a logical 1. FIG. 4G and FIG. 4H show a 3×3 cell before and after encoding a GP of logical 1 where the background contains white pixels (BP2, BP3, BP6), light gray pixels (BP1, BP4), gray pixels (BP7, BP8, BP9), resulting an average background which is more white than black. To encode a logical 1, the glyph pixel GP changes from a pre-encoding value of white to black.

To encode the logical 1, the glyph pixel moves to a post-encoding pixel value that is as far from average background pixel value as possible. However, to encode a data bit of zero (0), the GP pixel value is kept near to that of the average background. In one embodiment, the GP pixel value remains unchanged from the pre-encoding value. This technique works well if the GP grayness is not too different from the surrounding pixels to show the foreground visual image, which is usually the case for macroscopic foreground visual image shown by small pixels. In these cases, the glyph pixel GP in the center of the cell remains unchanged in pixel value to encode a logical 0. The difference between the GP after encoding a logical 0 and the average background is typically small. Therefore, an unchanged pixel represents either a logical 0 or a background pixel.

Figures 5A, 5B, 5C, 5D, 5E, 5F, 5G, 5H, 5I:
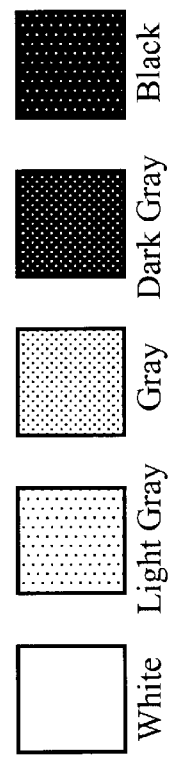
FIGS. 5A to 5I show embodiments of how pixels of cells encode logical "0."

An alternative is to actively set the post-encoding pixel value of the GP to be near, preferably the same as the average background. In this preferred mode, the difference in pixel value between the average background and the GP after encoding a logical 0 is zero. Comparing this zero difference with the difference of at least 127 in pixel value for encoding a logical 1, one can readily tell whether a GP represents a logical 0 or a logical 1. This method will function regardless of how different the GP is from the average background. As examples of this technique. FIGS. 5A, 5C, 5E, and 5G show four different cells with difference average pixel values before encoding a logical 0 and FIGS. 5B, 5D, 5F, and 5H show the four cells, respectively, of FIGS. 5A, 5C, 5E, and 5G after encoding a logical 0. FIG. 5I is the legend for FIG. 5A to FIG. 5H. Each cell has glyph pixel GP and background pixels BP1, BP2, BP3, BP4, BP6, BP7, BP8, and BP9. In FIGS. 5A and 5C, the background pixels BP1 to BP9 are all gray. In FIG. 5A, the pre-encoding GP is white and in FIG. 5C the pre-encoding GP is black, both of which are changed to gray after encoding a logical 0 (see FIGS. 5B and 5D). In FIG. 5E, some of the background pixels are black whereas some are in different shades of gray, having an average value of gray. As shown in FIG. 5F, the GP is set from a pre-encoding black to a post-encoding value of gray to encode a "0." In FIG. 5G the background pixels consist of gray, dark gray, and black for an average of dark gray. As shown in FIG. 5H the GP is changed from a light gray to dark gray to match the average background to encode a logical "0."

From the above illustrative examples, it is to be understood that a variety of background and glyph pixel values can be used in the above scheme of encoding. For example, the pixels can have any shade of gray and each of the pixels in a cell can have a different shade of gray. As long as the average background pixel value can be determined (calculated), the logical 1 can be encoded by reversing whereas the logical 0 can be encoded by maintaining the pixel value of the GP near that of the background. Using the above technique, a message can be embedded in a visual image in which the embedded message is neither conspicuous nor decipherable by visual inspection but which can be decoded by analyzing the relationship of the pixel values of the pixels in the image.

Although in the above-described embodiments, one cell represents one binary bit logical value, it is understood that one can construct "supercells" in which there are two or more glyph pixels adjacent to background pixels in each cell. In this way, either more information can be represented in the same space or the same amount information can be represented more robustly. Referring now to FIG. 3B, for example, the cell can be a 5×5 square with 25 pixels. There are 4 GPs and 21 BPs. Each of the 4 GPs 1302, 1304, 1306 and 1308 can represent a separate logical value, or the four GPs can collectively represent one logical value more robustly.

Image With More Than One Color

The technique of encoding and decoding a message in a visual image can be done in a colored image, i.e., one that contains a plurality of colors. As an illustration, an image made of multiple-color pixels (sometime referred to as "color" pixels for convenience) each having the three primary colors (red, blue, and green) can be used. In this way, a whole range of colors can be obtained to form the desired colors of the image. If one wishes, one can use colors different from red, blue, and green and the present technique will also work, although the visual image may not be as flexible in showing a variety of colors. In the embodiment of tri-color (red, blue, green) pixels, each color can have a brightness scale varying from 0 to 255 in pixel value similar to the grayscale range.

Similar to the grayscale image, one can define an encoding threshold as the average of the brightest and the darkest pixel values. Also similar to the grayscale embodiment, the logical bit 0 and 1 can be encoded by setting the glyph pixel color brightness based on the average of the pixel values of the pixels surrounding the glyph pixel. With three colors, if one wish, one can encode three times as much information as one can with a grayscale scheme, in a way analogous to the "supercell" described in the above for grayscale embodiments. For example, the red color can be used to encode the first part of the embedded message, the green color can be used to encode the second part of the message, and the blue color can be used to encode the third part of the embedded message. At decoding, the three parts can be linked together to form a longer whole message.

To encode a bit value of logical 1, briefly stated, the glyph pixel assumes a pixel value that is opposite (i.e., in high contrast) to that of the average background. In other words, it assumes a pixel value that is preferably the most different from the pixel value of the average to background. In this "reversal," the red channel, pixel value (PV) is set to 0 when the background average (BA) is larger than 127 or is equal to 127; PV is set to 255 when BA is less than 127. Similarly, in the blue channel and in the green channel each, PV is 0 when the background average (BA) is larger than 127 or is equal to 127; PV is 255 when BA is less than 127. Thus, when a glyph pixel "reverses" relative to the background in the pixel value to encode a logical 1, it goes to the extreme pixel value (i.e., its pixel is either the brightest 255, or the dimmest 0). In this way, the contrast between the PV before and after encoding is the largest. Using this scheme, the data bit can be encoded. Therefore, with three independently controlled colors, up to three bit values can be conveyed by one color pixel (CP), which as used herein contains one pixel of each color component (red, blue, and green in this embodiment).

As an illustration, FIGS. 6A to 6H each show a color cell having color background pixels BP1, BP2, BP3, BP4, BP6, BP7, BP8, BP9 surrounding a central color glyph pixel GP. FIG. 6I is the legend for FIG. 6A to FIG. 6H. Analogous to single-color cells, as used herein concerning color pixels and color cells, the terms glyph pixel (GP) and background pixel (BP) mean color glyph pixel and color background pixel respectively. In each color pixel is a red component, a blue component, and a green component. In FIG. 6A, all the color pixels are yellow and having a PV of (255, 255, 0), representing that the red component has a pixel value of 255, the green component has a PV of 255, and the blue component has a PV of 0. To encode a logical 1 the GP reverses from the PV of that of the background. Since the background red component has a PV of 255, the GP has a red component of PV of 0. Since the background green component has a PV of 255, the GP has a green component of PV of 0. Since the background blue component has a PV of 0, the GP blue component has a PV of 255. Thus, after encoding a logical 1, the GP has a PV of (0, 0, 255), which is blue (see FIG. 6B).

This scheme of encoding can be extended to other pixel values (PV). FIG. 6C shows a cell in which the PV of all the pixels are each (0, 255, 255), i.e. cyanic (meaning deep green and blue here). Since the background average is (0, 255, 255), the GP after reversal to encode a logical 1 has a PV of (255, 0, 0), which is a color of deep red (FIG. 6D).

To encode a data bit value of logical 0, the three color components each attain the pixel value of the average background. For example, in FIG. 6E, the background pixels BP1 to BP4 each are blue having a PV of (0, 0, 255) and the other background pixels BP6 to BP9 are red (255, 0, 0). To encode a logical 0, the GP attains a magenta color, i.e., a PV of (127, 0, 127). Similarly, FIG. 6G (pre-encoding) and FIG. 6H (post-encoding) show the GP whose background is half green and half red attaining a color of yellow (which is composed of red and green) to encode a logical "0."

Although not described in detail herein, other combinations of colors of various pixel values can be used by one skilled in the art based on the present disclosure. As a further example, not shown in a figure, the glyph pixel GP is green (0, 255, 0). The background pixels include a variety of colors: pixel BP1 is yellow, pixel BP2 and BP3 are red, pixel BP4 and BP6 are green, pixels BP7 and BP8 are deep blue, and BP9 is red, resulting in an average background pixel value of (96, 80, 96). As a result, after encoding a logical "0," the glyph pixel GP has a pixel value of (96, 80, 96), which is gray.

Encoding Glyph Block

Figure 7:
FIG. 7 shows the image of pixels displaying the word "Webstar".
Figure 8A:
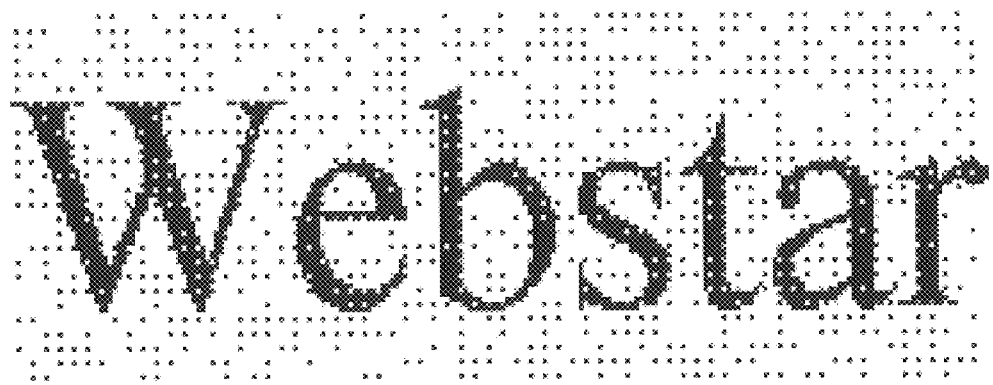
FIG. 8A shows a glyph image displaying "Webstar" with an embedded message.

The scheme of encoding logical values of "1" and "0" can be used to encode an image of pixels with an embedded message. For example, one may want to embed a URL address (web-site address) in an image such that the image will be readily recognized and understood by an observer without much distortion caused by the message. As a more specific example, one may want to embed the URL address "http:\\www.webstar.com\" in a displayed image that shows the word "Webstar". FIG. 7 is the image of pixels displaying the word "Webstar" (i.e., the foreground image) without any embedded message. After embedding the message according to a method of the present invention, the image becomes one shown in FIG. 8A. The images in FIGS. 7 and 8A are substantially the same in that the object of the foreground image, the word "Webstar" is still clearly recognizable in FIG. 8A. At a distance, FIG. 7 and FIG. 8A look the same except for an overall gray taint in FIG. 8A. The presence of the encoded message is indicated by the presence of dots, i.e., black pixels in the white area and white pixels in the black area.

Knowing the visual image desired and the message to be embedded in the visual image, one can use an encoding process including the following steps. As used herein, a "glyph block" is a block, i.e., array of pixels that contains the image for a viewer's visual recognition and the encoded message. Thus, the glyph block (or sometimes simply called as "block" hereinafter) consists of 1) a user-defined foreground string, which conveys the visual image, and 2) an encoded data stream that is a representation of 0s and 1s of the message. The pixel appearance representing the encoded message data is not obtrusive and is unrecognizable by casual viewing by a viewer under normal lighting. The size of a block is determined by the size of the foreground string or according to the user's desire as long as it is larger than the size of the foreground string.

For the illustrative embodiment below, the following dimensions are used:
Cell Dimension=3×3 pixels;
Tile Dimension=2×2 cells; and
Block Dimension=m×r tiles.

The glyph block can be encoded with the following exemplary steps:

1. Select the glyph block size. Based on the foreground image that is to be shown for visual perception, one will know the foreground string size, from which the glyph block dimensions can be chosen. The glyph block dimensions can be selected to adequately display the visual image, e.g., "Webstar" for visual recognition and for embedding the message. For example, as shown in FIG. 7, the visual image "Webstar" in a 48 point "Times New Roman" font can be displayed for visual recognition with a glyph block of 210×78 pixels, i.e., 70 columns and 26 rows with a total of 1820 cells, each of which containing 9 pixels. In a scheme in which there are three data cells to one sync cell in a tile, the total number of block columns (counting in the horizontal dimension) is the equivalent of: 210 pixels=70 cells=35 tiles. The total number of rows (counting in the vertical dimension) is the equivalent of 78 pixels=26 cells=13 tiles. The block thus contains a total of 70×26=1820 cells. In an illustrative tile structure that contains only three data bits per sync bit, the data capacity of the block for conveying data information is therefore 1820×(¾) bits, i.e., 1365 bits, which is 170 bytes. The sync capacity of the block for storing data decoding parameters is 1820×(¼) bits, i.e., 455 bits, which is 56 bytes.

2. Determine the message to be embedded. Depending on the nature of the message the user wants to encode, the proper message is selected, so long as the encoded message size is a fraction of the size of the glyph block size to allow for adequate error correction. The level of error correction affects how large or small the message size can be. For example, the glyph block size having a data capacity of 170 bytes is adequate for encoding the Internet URL address: "http:\\www.webstar.com\", which has a message size of 23 bytes.

3. Create the block tag. A block tag contains information used for decoding. More specifically, the block tag contains information on the block type, block ID, message size and error correction method. The information on the block type and block ID are used to identify serial and parallel blocks. Information on the message size and error correction method is used in error correction decoding. In a decoding embodiment, the block tag is fixed in size, 4 bytes, since block tag contains fixed amount of information.

In the above "webstar" embodiment:
Error Correction Size for Data=Data Capacity−Message Size=(170-23) bytes
Error Correction Size for Sync=Sync Capacity/2−Block Tag Size=(56/2-4) bytes Error correction size for data determines how many errors may occur in the data area and still be tolerated. For example, given Reed Solomon Error Correction Code is used and error correction size for data is 157 bytes, there could have been up to 157 bytes of error in the data area, and the correct data is still recoverable. Similarly, if the error correction size for sync is 22 bytes, there can be up to 22 bytes of error in the sync area and the correct sync is still recoverable.

4. Create the synchronization stream (sync stream) by combining the block tag and the associated error correction data. The sync stream is a stream of logical 0s and 1s which can be generated as a function of the block tag. To protect the block tag from any possible errors, an error correction method, e.g. commonly known Reed Solomon Error Correction Code, or functional specially devised error correction method, can be used:

Sync Stream=Block Tag+Error Correction Function (Block Tag)

Techniques for generating and using error correction code in self-clocking glyph codes are known in the art, e.g., U.S. Pat. No. 5,771,245 (Zhang) which is incorporated by reference in entirety herein. In a preferred mode according to the present invention, the sync bits in the sync stream are arranged so that the sync stream has symmetric characteristics. For example, the sync stream has a forward component and a reverse component wherein the forward component matches the reverse component in opposite order. This scheme is illustrated in the data block cell layout shown in FIG. 13. The location of the sync cells are shown by s1, s2, s3, and the like. The data cells are shown by labels of d1, d2, d3, and the like. In this illustrative example, the block 1310 has 13×5 tiles, each of which has 2×2 cells. The block 1310 thus has 32 forward sync cells, designated as s1 to s32, as well as 32 backward sync cells, designated as s1' to s32'. The s1 cell 1301 of the forward sync stream is located at the first tile at the upper left corner of the block 1310. The s1' cell 1302 of the backward sync stream is located at the last tile at the lower right corner of the block 1310. The data cells are arranged in order starting from the first tile (which contains data cells d1, d2, d3) to the last tile (which contains data cells d191, d192, p, where p is a padding cell). Alternative schemes of the symmetry technique can also be achieved, for example, more than one matching sync stream portion can be used by locating four sync streams at the corners of the block. Other embodiments of symmetry will be described later, see "Self-Symmetry code," infra.

5. Generate Data Stream by combining the embedded message stream and the error correction stream. One method is to spatially concatenate the embedded message stream and the error correction stream (i.e. Data Stream=Message Stream+Error Correction Stream). For example, in the block shown in FIG. 13, using the concatenating technique, the first data bits are the message stream. The error correction stream follows immediately after the message stream. One skilled in the art will know that such a concatenating technique is for illustrative purpose and various schemes of arranging the message stream and the error correction stream can be used. Data from the message stream and the error correction stream can mingle together as long as the mingling method can be interpreted on reading the image to decipher the message.

6. Create data block by interleaving the sync stream with the data stream. Fill each tile first with one sync bit, and the rest of the tile with (n×n−1) data bits. The location and the content of the sync bits are known and laid out as described above. Once the data bits are known, since location of the sync bits are also known, the data stream bits can be put in, ordered in an arrangement one bit after another, going from top to bottom and left to right from one tile to the next from the first tile to the last. In this way, the data bits d1, d2, d3, d4, etc., are arranged as shown in FIG. 13. The example of a tile 1312 with four cells (e.g., four cells s1, d1, d2, d3) is shown in FIG. 13. In this way, the sync bits and the data bits are spread quite evenly over the block. This provides an unobtrusive way to spatially synchronize the data, enabling a visual image that is substantially homogenous except for the desired image to be presented, be it a word, a phrase, or an image of a bowl of fruits.

7. Encode the data block from logical values into the desired visual image to produce a final encoded glyph image containing pixels. The glyph image will show an image recognizable in a casual viewing. See, FIG. 8A, which shows the glyph block with the embedded message in a visually recognizable image "Webstar".

Figure 9A:
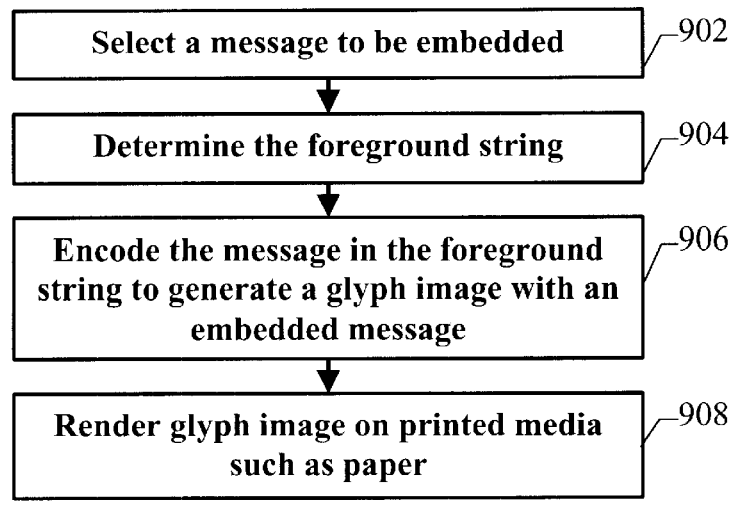
FIG. 9A illustrates in flow chart form briefly the process of encoding an embedded message.

An illustrative embodiment of message encoding process which can be used in the encoding embedded messages is depicted in flow chart form in FIG. 9A. First, the foreground visual image to be depicted and the message to be embedded in the foreground visual image are determined. This can be done by selecting a message to be embedded (block 902) and determining the foreground string (block 904). Then, the message is encoded in the foreground string to generate a glyph image with an embedded message (block 906). This glyph image is displayed, e.g., by printing on a medium such as paper (block 908).

Figure 9B:
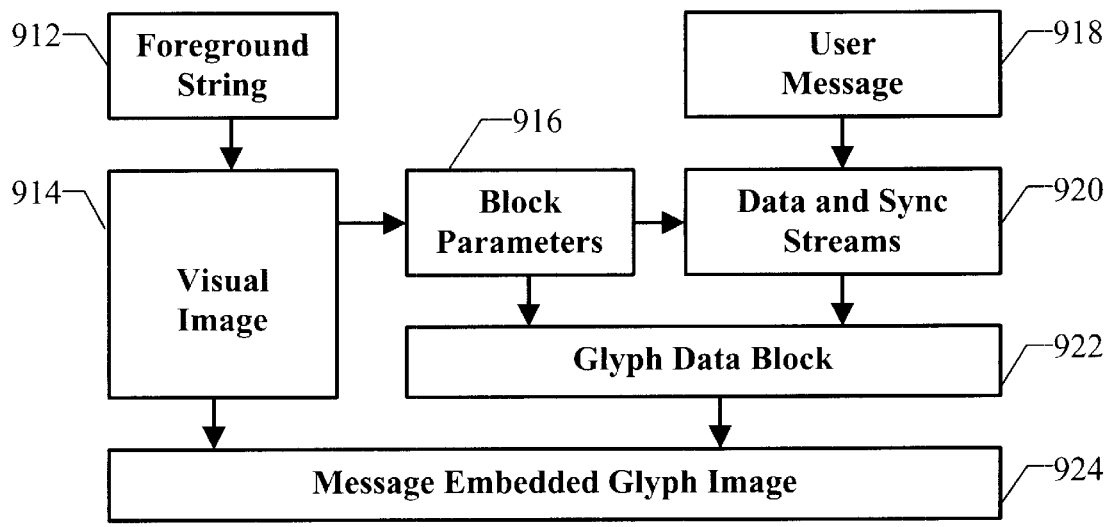
FIG. 9B illustrates an embodiment of the encoding technique in block form.

In more detail, the encoding of an illustrative embodiment showing a foreground image of words is depicted in FIG. 9B. Knowing the words and the font of the image of the foreground sting 912, a visual image 914 is created. From the visual image, the block parameters 916, such as the block dimensions, are determined. On the other hand, knowing the user message 918 to be embedded, and based on the block parameters and the error correction method chosen, the data stream and sync stream 920 are created. Arranging the data stream and the sync stream 920 according to the block parameters 916 results in a glyph data block (data block) 922. Incorporating the logical values of the data block into the visual image will result in a glyph image embedded with the user message 924.

Self-Symmetry Code

As shown in the above, one method to synchronize the data bits is to include a sync stream in the glyph block along with the data stream, in which the sync stream is symmetric but the data stream is asymmetrical. One advantage of symmetry is to provide an extra layer of error protection. Another advantage is the ability to recover block location and dimension quickly.

Figure 10:
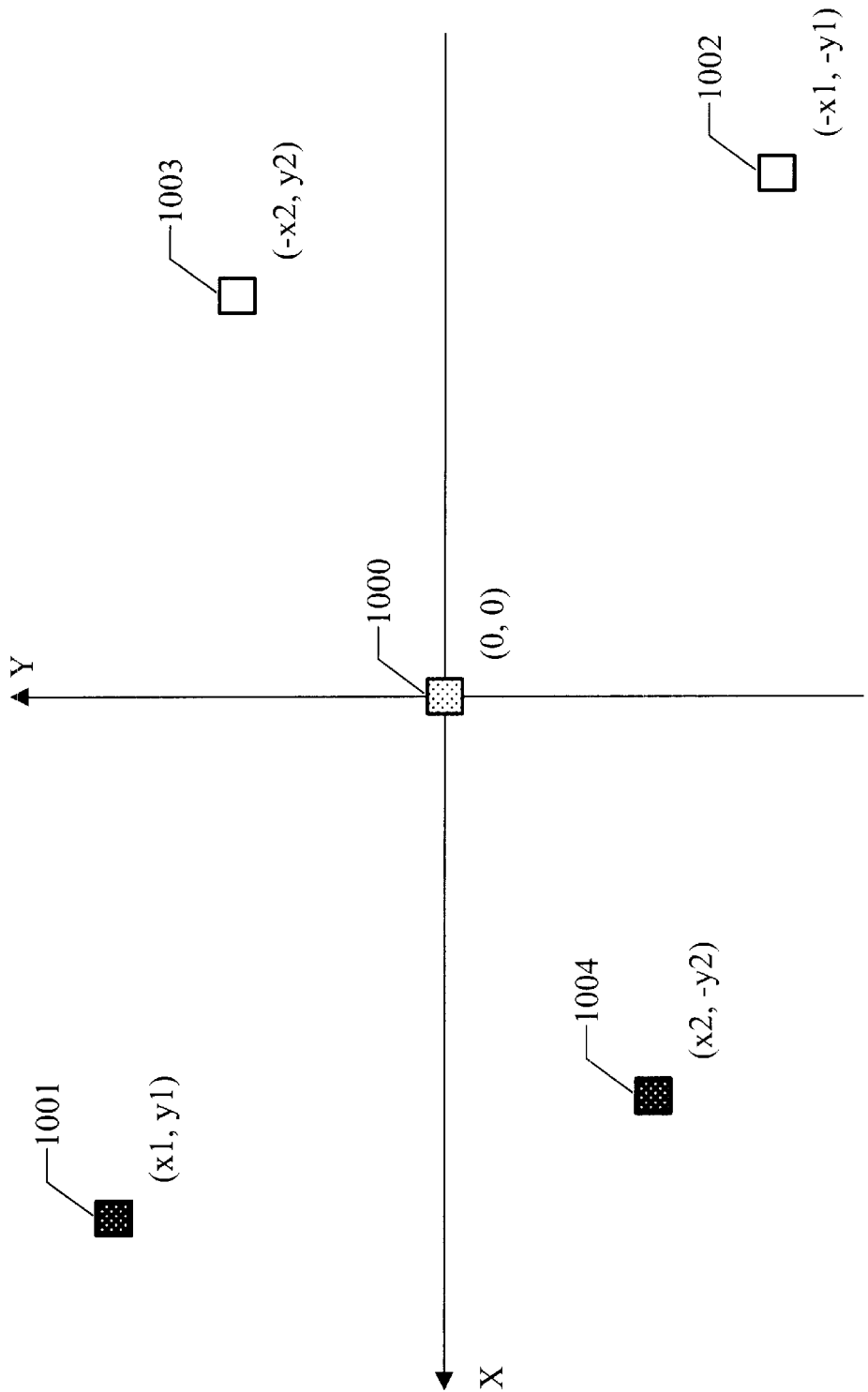
FIG. 10 shows self-symmetry including glyph cells laid symmetrically around a global center cell.

FIG. 10 illustrates an embodiment of such a method. In FIG. 10, the self-symmetry code includes glyph cells laid symmetrically around a global center cell 1000. Glyph cell 1001 (having coordinates of x1, y1) and glyph cell 1002 (having coordinates of −x1, −y1) on opposite sides of the center cell 1000 (having coordinates of 0, 0) form a pair of cells in mirror position of each other (about the center cell 1000). Numerically, the logical values of the two cells are inverse of each other. Geometrically the locations of the two cells are diagonally symmetric about the center cell 1000. The pair of glyph cell encodes one digital bit value. If primary bit 1001 is larger than mirror bit 1002, the digital bit value is 1. If the opposite is true, then the digital bit has a value 0. The error protection is evident since the primary bit 1001 can never equal to mirror bit 1002. If they are equal to one and another, then there is an error in either cell 1001 or cell 1002. The ability to find location and dimension of a block quickly is also apparent since all symmetric cells are about the center cell 1000 and the symmetry can be tested quickly.

Generally there are three types of block layouts for self-symmetry codes: 1) first layout: a single layer block with no sync cells; 2) second layout: double layer block with symmetric sync cells and symmetric data cells; and 3) third layout: double layer block with symmetric sync cells and asymmetric data cells. Sync cells are used to provide a storage space for block tag information and further used to synchronize the associated block. Data cells are used to store message data and the relevant error correction data. Each double layer block has an associated block tag, which, as previously stated, contains information such as message size, error correction method, block index and block type. Block tags are encoded into the sync streams by error correction coding. Typically, the first type (without sync cell) is used for encoding a small amount of user message into a small sized image. In this case, instead of using sync cells to store the block tag, one or more default block tags can be assumed. For example, within one default block tag the error correction size equals to half of a block's data capacity, and within another default tag the error correction size equals to one fourth of a block's data capacity, etc. While decoding, a trial and error approach can be used. If the decoding of a single layer block fails to successfully decode using the first default block tag, then the second default tag, and the third, etc., can be tried. If the decoding fails to decode properly using all the default tags then the block is not decodable.

Figure 11:
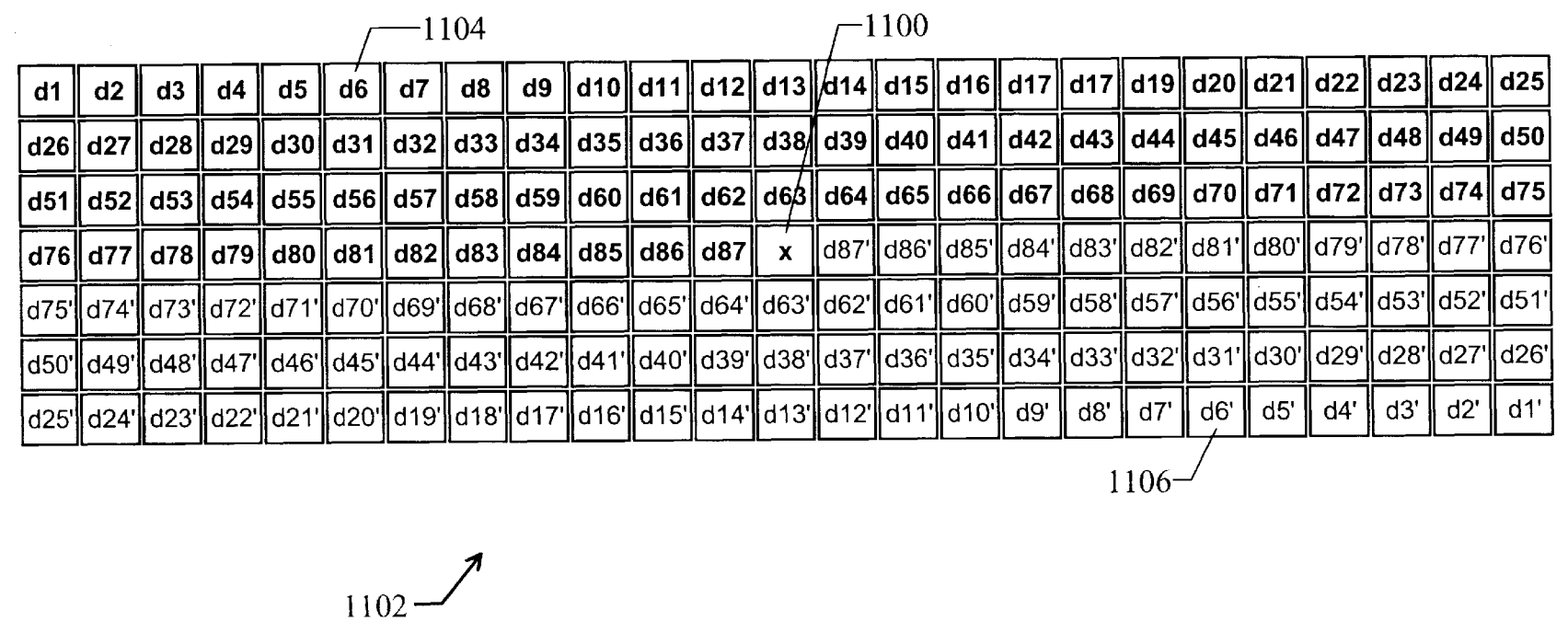

FIG. 11 shows an embodiment of the first layout: a single layer block. In the data map 1102, primary data cells d1 to d87 have mirror cells d1' to d87' surrounding a centrally located center cell 1100 (shown as x). The primary data cells are diagonally symmetric relative to the mirror cells about the center cell 1100. Synchronization is achieved by arranging data cells symmetrically around the center cell. This layout of cells can be identified by a cell-wise symmetry test (i.e., each cell has a mirror cell). When the image is read and such symmetry is found, the beginning of the data stream can be located and the data in the data stream can be analyzed (i.e., decoded) to reveal the embedded message. In such self-clocking codes, the synchronization elements (i.e., the elements that tells a reader the spatial synchronization so that the decoding can be maintained in a proper order) are data bits that convey the data, which may include the embedded message and the relevant error correction data. The data map 1102 has 25×7 data cells. The data map 1102 has a forward data stream 1104 (represented by cells d1, d2, d3, d87) and a backward data stream 1106 (represented by cells d1', d2', d3', . . . , d87'). The bits of the forward data stream 1104 start at the first cell (d1) as the first bit and move forward and the bits of the backward data stream 1106 start as its "first" bit at last cell (d1') and move backward in the data map 1102. By comparing the bits starting from one corner to the bits starting from the opposite corner, the orientation of the data stream can be determined and the decoding can then be properly done to recover the embedded message. Further, since the data map 1102 is diagonally symmetric, picking the center cell x and comparing the adjacent cells thereto can also show the orientation of the cells. For example, if cell d87 is the mirror image in logical value of cell d87' and cell d86 is the mirror image of cell d86', and so on, one can conclude that the data stream starts at cell d1 and continue the decoding process. With the present technique, the first bit to the last bit of the data stream can be correctly determined without using sync bits that are not part of data stream.

The second block type with symmetric sync cells and symmetric data cells is used to encode moderate amount of user message. The third type with symmetric sync cells and asymmetric data cells is used for encoding a larger amount of user message. With a single layer block, the error correction is carried out on message stream only. (Note that the data stream is the message stream plus error correction stream.) With a double layer block, the error correction is carried on both the sync stream and the message stream. If the error correction to the sync stream fails then there is no need to do the error correction to the message stream. Since the sync stream is much smaller than the message stream, the associated error correction can be tried more quickly. If the sync stream is recovered successfully, the related block tag, block location and dimension are therefore correct. Subsequently, the error correction on message stream needs to be done only once. This property enables one to carry out the error correction on the sync stream many times in trying to find the correct block tag and the block location without slowing down the overall decoding speed significantly.

Figure 12A:
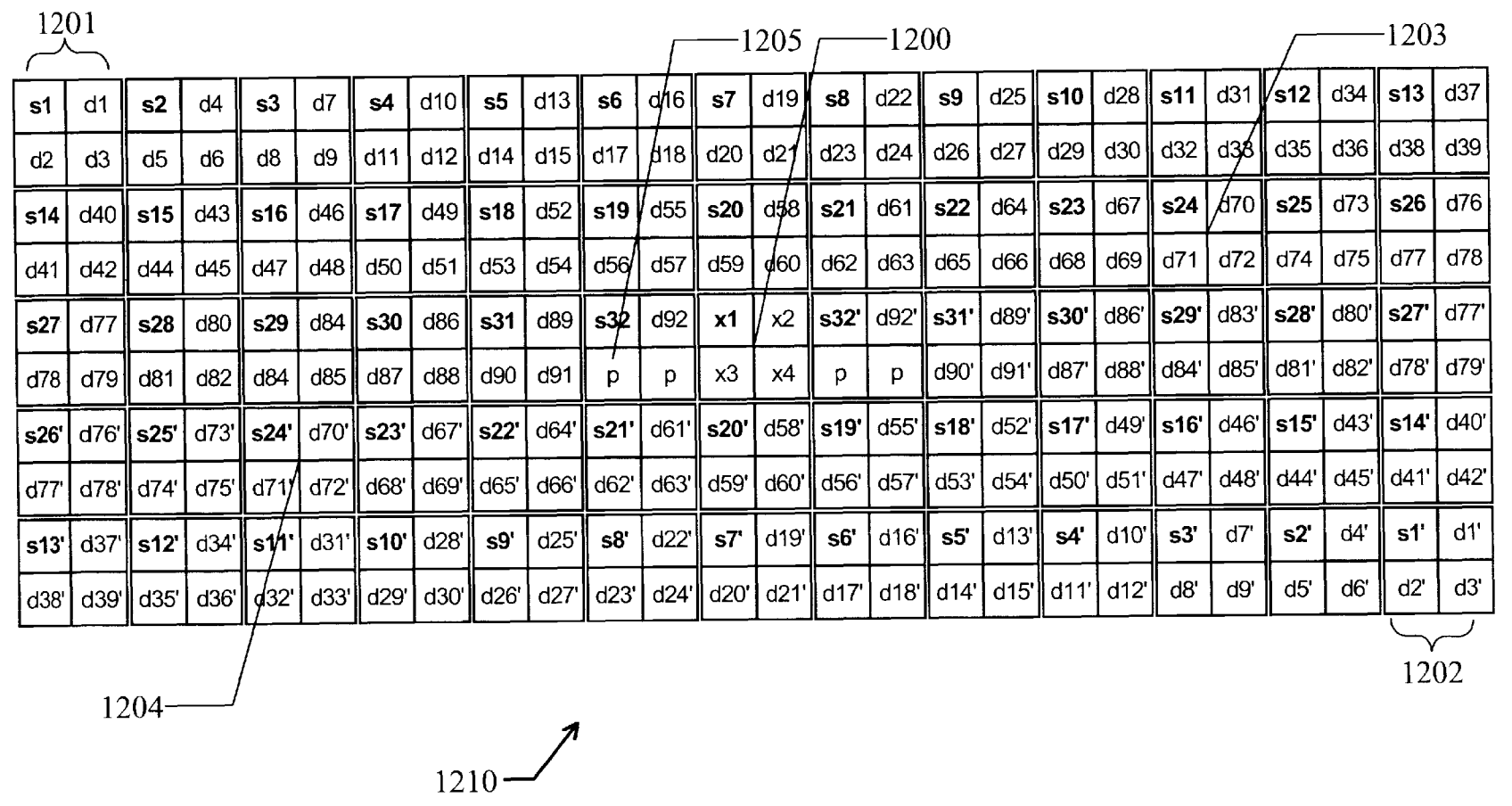

A double layered block has both sync cells and data cells. For example, FIG. 12A shows a double layered block 1210 having both sync symmetry and data symmetry. The block has tile-wise symmetry, i.e.; each tile has a mirror tile on the opposite side of the center tile 1200. Primary tile 1201 and its mirror tile 1202 are diagonally symmetric about the center tile 1200. Another example of symmetry involves tile 1203 and tile 1204. Cells s1 to s32 depict the forward sync stream whereas cells s1' to s32' show the backward sync stream. Cells d1 to d92 show forward data stream whereas cells d1' to d92' show the backward data stream. All cells indicated by the letter p are padding cells, occupying empty cells to allow the completeness of the tiles. For illustration. FIG. 12B shows a forward sync stream with the block tag and the error correction code and FIG. 12C shows a backward sync stream which is a mirror image of the forward sync stream of FIG. 12B. FIG. 12D shows a forward data stream with the message stream and the error correction code and FIG. 12E shows a backward data stream which is a mirror image of the forward sync stream of FIG. 12D.

As mentioned previously, FIG. 13 shows a double layered block 1310 with symmetric sync cells but asymmetric data cells about the center tile 1300. The sync cell x of the center tile 1300 is the center sync cell of all the sync cells. Cells s1 to s32 depict the forward sync stream. Cells s1' to s32' depict the backward sync stream. Sync cell s1 (denoted by cell 1301) has a corresponding mirror sync cell s1' (denoted by cell 1302), and so forth. Cells d1 to d192 depict the data stream and have no mirror cells, since the data stream is asymmetrical. Cell 1304 is a padding cell.

If one chooses to, one can use synchronization method in which both the sync stream and the data stream are asymmetrical. With the present disclosure, the use of asymmetric synchronization methods is within the skills of one skilled in the art and such asymmetric methods will not be described in further detail.

Decoding Glyph Block

Given a visual image with an embedded message, one decodes the displayed image by capturing the displayed image as a glyph image, transforming the glyph image to reduce the significance of the foreground image and finding the logical values represented.

From the pixel value of a glyph cell, the logical value of the glyph cell can be decoded by reversing the encoding method of "1" and "0" above.

To implement the decoding of the glyph block, the following steps can be used.

1. Capture the glyph Image in an image reader. For example, the image "Webstar" URL embedded grayscale image of FIG. 8A can be read using a two-dimensional CCD or CMOS image reader (a camera, etc.)

Figure 8B:
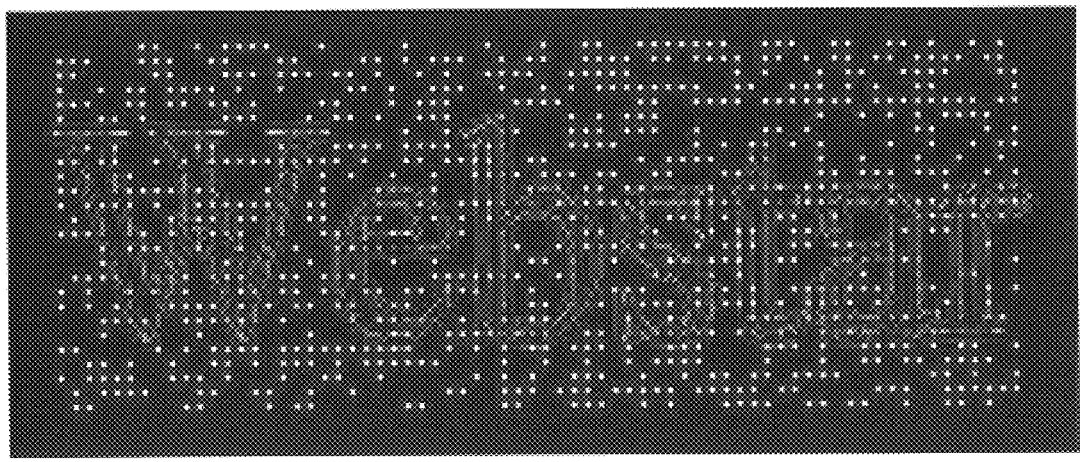
FIG. 8B shows a glyph map corresponding to the glyph image of FIG. 8A.

2. Produce the graph map by pixel transformation. This transforms the glyph image (e.g., FIG. 8A) into a glyph map (e.g. shown in FIG. 8B). In FIG. 8B, white pixels in this glyph map represent glyph pixels of logical value 1. Black pixels may be glyph pixels of logical value 0 or background pixels. To create the glyph map, pixel transformation on the glyph image is performed calculating the transformed pixel value from the measured pixel value with an equation.

To this end, pixel transformation to produce the glyph map from the glyph image can be accomplished by first computing the value of cell contrast (CC) for each pixel, i.e. the absolute difference of that pixel value from the average of those pixels surrounding it, (e.g., the absolute difference between a GP and its background pixels BP). The CC is calculated for all pixels, including GPs and BPs. For example, in the embodiment in which a GP is surrounded on all four sides by background pixels (e.g., as in a 3×3 cell such as in FIG. 3A), the CC is:

$$CC=ABS(GP_m-(BP1+BP2+BP3+BP4+BP6+BP7+BP8+BP9)/8)$$

Where "ABS" means the absolute function, $GP_m$ is the measured pixel value of the glyph pixel (GP), and BP1, BP2, BP3, BP4, BP6, BP7, BP8, and BP9 are the measured pixel values of the background pixels immediately surrounding the GP (see FIG. 3A). This results in a glyph map shown in FIG. 8B, which contains white pixels, black pixels, and gray pixels. It is noted that all background pixels will generally have a CC of small value and will appear black. Also, due to the encoding method used, logical values of "0" will also appear black in FIG. 8B. White pixels in FIG. 8B represent logical values of "1".

It is noted that this method of calculating the cell contrast is applicable in a variety of cell sizes and cell configurations as long as the relative position between a GP and the BPs is predefined. For example, in a 2×2 cell, when the pixels are placed in a regular pattern (e.g. in each cell, the GP is in the upper left hand corner and the background pixels (BPs) are at the other corners of the square), each GP is still surrounded by BPs, albeit some of the BPs in the above equation may originate from two or more cells for a CC value for a GP. Similarly, the equation can be used for calculating CC for other cell sizes.

Essentially, in FIG. 8B, if the CC value of a glyph pixel GP is above a certain predetermined value, then the GP is a "1" logically. If the CC for the GP is small, then the GP has a logical value of "0." Thus, to determine the logical value of a glyph pixel, the CC value of a GP is compared to a decoding threshold DT, which can correspond to the value of ET (the encoding threshold in encoding). For example, if the ET is the average pixel value of a darkest pixel (pixel value of 0) and a white pixel (pixel value of 255), then DT can be the average between the whitest value and the darkest value in the pixels in FIG. 8B. The logical value, i.e., bit value (BV) of a glyph pixel GP is:

BV=1 when CC>DT or CC=DT

BV=0 when CC<DT.

These bit values (BV) form the normalized transformed pixel value of the GP, and result in a map with logical "1" and "0" positions.

This scheme of decoding is illustrated in the following example. For example, in a glyph cell similar to the cell in FIG. 4B, a black, central pixel GP is surrounded by white background cells BP1, BP2, BP3, BP4, BP6, BP7, BP8, and BP9. After transformation, the central pixel GP will be white and the background pixels will be black. After calculation, BV will be determined to be 1. This is exactly the logical value encoded by the aforementioned encoding technique for FIG. 4B. Likewise, in a glyph cell similar to FIG. 4D, a white central cell GP is surrounded by black background cells BP1, BP2, BP3, BP4, BP6, BP7, BP8, and BP9. After transformation, the white central GP remains white, whereas the black background BPs remain black. Again, in this case. CC is bigger than DT. Thus. BV is also 1. Similarly, glyph cells such as those shown in FIGS. 4F, 4H, 5B, 5D, etc., can be transformed and their CC values compared to DT for determination of the logical values.

In embodiments with multicolored pixels, in analogous manner, the pixels can be transformed and the GP logical values calculated, by finding whether the value of CC versus that of DT for the various colors.

3. Create the cell map using a two dimensional histogram to determine the cell size.

Figure 18:
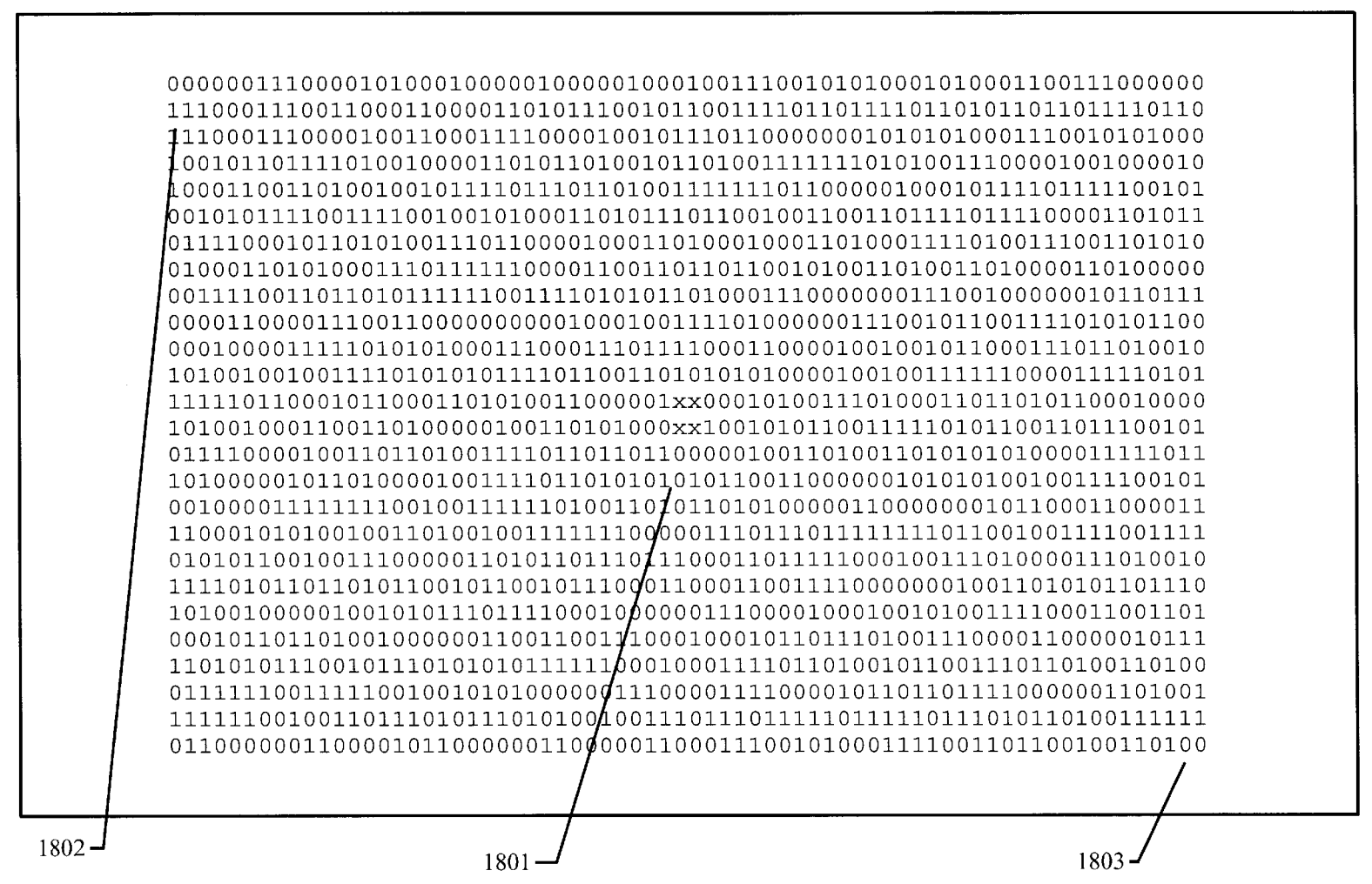

To create the data map (FIG. 18), in which all the GP logical values are known, the location of the GPs must be precisely determined. To do this, a cell map showing the cell dimensions and the cell configuration (i.e. the relation between neighboring cells) and a grid map showing the grid along which GP pixels are lined can be found. The following method can be used.

(A) Find all local maximum pixels in the glyph map. A "Local Maximum Pixel" is a pixel whose pixel value is larger than or equal to (>=) the pixel value of all adjoining pixels in any matrix of pixels, e.g., 3×3 pixels, not limited to any single cell. As will be described in more detail below, local maximum pixels are used for determining the cell dimensions in decoding the information in a glyph block. A "Local Average" is the average pixel value of any 3×3 pixels. A local average has a value between 0 and 255 for pixels in FIG. 8B. A mathematical algorithm can be formulated and a computer method can easily be implemented to compare the pixel values in the glyph map to find the local maximum pixels by one skilled in the art, for example, by using the pixel values of FIG. 8B.

(B) Select a local window size w×w such that the window is wide enough to cover a number of cells. For example, a w value of {w=2×(maximum cell size)+1} can be used; and if one assumes the maximum size of a cell is 6×6 pixels, then w=2×6+1=13. A "local window" is a window of w×w pixels with the local maximum pixel being the center of each window. All local maximum pixels should have a local window.

(C) Create a two dimensional histogram of size w×w, e.g., a 13×13 histogram by stacking (i.e. summing) all pixels values of all local windows to the histogram. For convenience, the normalized transformed pixel values of logical "0" and "1" can be used. It is understood the non-normalized pixel values of FIG. 8B can be used to form the histogram and the cell size can still be determined by searching for the maximums in the histogram.

(D) After all window values are accumulated, the histogram becomes the cell map (shown in FIG. 8C) showing the accumulated pixel values around the neighborhood of the local maximum pixels. Statistically, the large values will represent the glyph pixels and the small values will represent the background pixels. Using the cell map as a template and extending it over the glyph map (e.g., FIG. 8B), one can find the locations of the glyph pixels (GPs).

To determine the cell size, the following method can be used.

(A) Find the center pixel of the accumulated local windows in the cell map (e.g. cell map portion shown in FIG.

8C. The largest number in the map represents a GP, e.g., 9 in the cell map of FIG. 8C. Find also four other local maximum pixels nearest to the center pixel (which can be called the left, right, above, and below glyph pixels, or LGP, RGP, AGP, and BGP), which are the bolded numbers in the cell map (the glyph pixels in bold are all 5s in this embodiment of FIG. 8C).

Figures 8C, 8D:
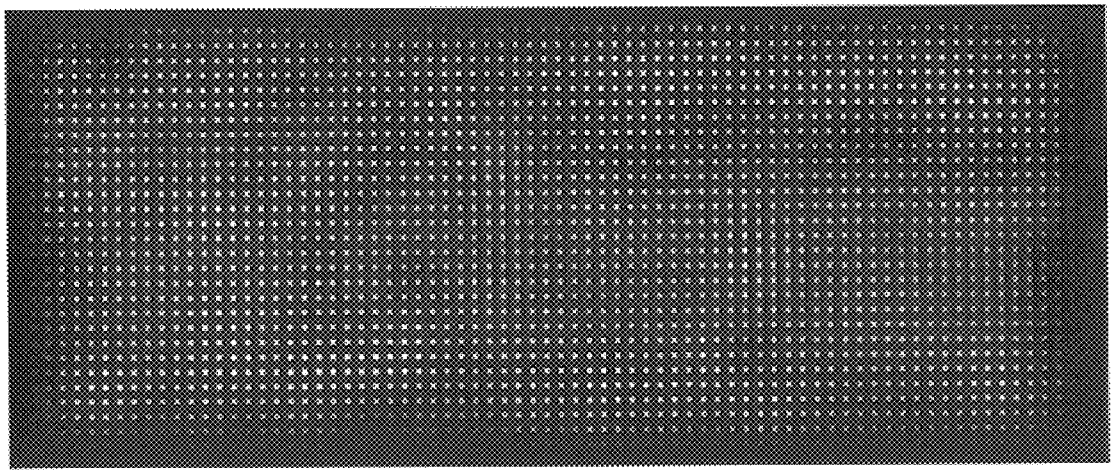
FIG. 8C shows a cell map portion corresponding to the glyph image of FIG. 8A.
FIG. 8D shows a grid map corresponding to the glyph image of FIG. 8A.

(B) Compute the cell size as the average distance from the center pixel to the four neighbor glyph pixels (GP). For example, the cell size in FIG. 8C is (3+3+3+3)/4=3. That is, the cell dimension recovered is 3×3 pixels.

4. Create the grid map using the cell map and the glyph map. To ensure the correct block location and the block dimension within a scanned image, one can determine a grid in which all GPs (data or sync if any) are located. The grid map (see FIG. 8D) is created for this purpose. Knowing the cell size, for every pixel in the glyph map that is suspected to be a GP pixel, the value of the pixel ($p_i$) is revised by adding to it the four nearest suspected GP pixels to the left ($lp_i$), right ($rp_i$), top ($tP_i$) and bottom ($bp_i$) thereof to form an updated (or revised) grid pixel value, i.e., $$P_{i,\ revised} = p_i + lp_i + rp_i + ap_i + bp_i.$$

This process is repeated for a number of times, e.g. 4 or 5 times. For a GP pixel in the block, even if it starts with a low pixel value (e.g., for a logical "0" pixel with low contrast to the BPs), due to the larger pixel values at local maximums, (i.e., glyph pixels), after a few iterations, the pixel value will progressively increase because of the neighboring glyph pixels that are bright (i.e., with large pixel value). In this way, a grid of bright pixels will be formed to represent the block in which the glyph pixels are located. This technique is equivalent to inspecting the glyph map to find the contrasting white dots (pixels) and filling in the glyph map in the black area is between the white dots at locations one cell-length apart to determine all the glyph pixel locations. The above technique of calculation is only one practical method of ascertaining the positions of the glyph pixels, whether in a logical "0" or "1" state. One skilled in the art will be able to select other alternative methods.

5. Generate the normalized logical data map such that the tile size of the glyph block can be found and the block tag can be recovered. To create the normalized logical data map (e.g., FIG. 18) the following method can be used. Take the coordinates of all local max (i.e., maximum) pixels in the grid map (e.g. FIG. 8D), and get the corresponding pixel values from the glyph map (e.g., see FIG. 8B). This creates the cell representation of the glyph block, i.e., by picking only the value of GPs; all background pixels are dropped. In this way, one can distinguish the background pixels and the GPs of logical "0" in the transformed glyph map FIG. 8B although both have the same pixel value in the glyph map. Subsequently the entire data map can be normalized to some predetermined minimum and maximum values. Then, one can determine if the block is a single layered or a double layered block by running a symmetric test. For a double layered block, the symmetric test will also uncover tile size.

6. Recover the sync stream and the related block tag. For a double layered block with sync symmetry, the sync stream is recovered by determining symmetry. In an embodiment with center tile, because of forward and backward sync streams are circular symmetric about the center tile, the center tile is first identified, and consequently, the forward and backward streams are recovered. Since the forward and backward sync streams are numerically inverse of one another, the binary value (BV) of sync bits can be recovered by comparing forward sync bits with backward sync bits. The BV of a pair of sync bits is one if the value of the forward sync bit is larger than that of backward sync bit. The BV of a pair of sync bits is zero if the value of the forward sync bit is less then that of backward sync bit. The BV of a pair of sync bits is unknown if the value of the forward sync bit is equal to that of backward sync bit, which means there is an error in one of the sync bits. To recover the block tag embedded in the sync stream, one needs to know the relevant error correction size. By design, the block tag is fixed in size (four bytes), the error correction size for the sync stream therefore can be computed by subtracting the block tag size from the sync stream size. With knowledge of the error correction size and a pre-determined error correction method, the error correction decoding can be carried out. If the error correction decoding is successful, the correct location, dimension and ordering of the relevant block are definite.

7. Recover the data stream and the embedded user message. For a block with symmetric data cells, the recovery of bit value (BV) of the data stream is similar to that of the sync stream. For a block with asymmetric data cells, the recovery of BV is achieved through the following steps.

(A) Compute the local threshold (LT). For example, in a glyph map similar to the one in FIG. 8B, for every tile, if the sync cell=1. find the nearest tile with the sync of 0; else (i.e., if the sync=0), find the nearest tile with the sync of 1. Then LT is the average pixel value of sync logical 1 and sync logical 0.

(B) Decode the bit value (BV) of data cells in a tile.

BV=1, if the pixel value of the data cell>=LT
BV=0, if the pixel value of the data cell<LT It is noted the value of LT selected based on the threshold used for encoding logical 0 and logical 1 in the encoding process. Selecting a threshold as the average of the pixel value of logical 0 and logical 1 is only one embodiment of the present invention.

(C) Repeat above steps all tiles. A data map results, having the logical values of all the bits (similar to one shown in FIG. 18). The data map is obtained by mapping the grid map over the glyph map to obtain the logical values. It is understood that a person skilled in the art will be able to map the grid map on the glyph map to obtain logical values for the cells even to compensate for linear or nonlinear distortions. In the embodiment shown in FIG. 18, a self-symmetry double-layers, sync symmetric and data symmetric data map is shown. The center tile 1801 is marked by four x's. The embedded message is recovered using the decoded data stream. Error correction is performed on the data stream to recover the embedded message. This is accomplished by reversing the function that was used in generating the data stream from the embedded message:

Embedded Message=function (Data Stream)

If error correction is successful, then the embedded message can be recovered correctly, e.g. Embedded Message= http:\\www.Webstar.com\

Figure 19A:
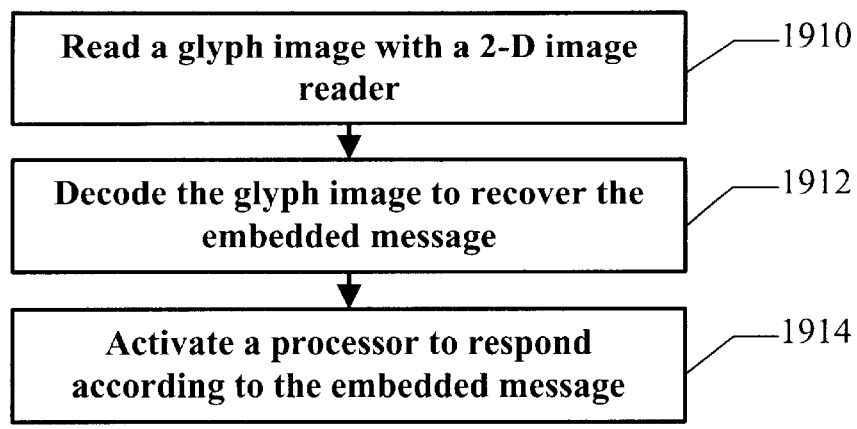
FIG. 19A illustrates in flow chart form briefly the process of decoding and responding to an embedded message.

FIG. 19A illustrates in flow chart form briefly the process of decoding and responding to an embedded message. To decode, a glyph image is first captured, e.g., with a 2-dimensional reader (block 1910). The glyph image is decoded to recover the embedded message (block 1912). To respond, a processor can act upon the decoded, embedded message, e.g., by directing a web browser (e.g., MICROSOFT INTERNET EXPLORER, Microsoft Corporation; NETSCAPE COMMUNICATOR, Nestcape Corp., etc.) to connect to a URL address which is the embedded message.

Figure 19B:
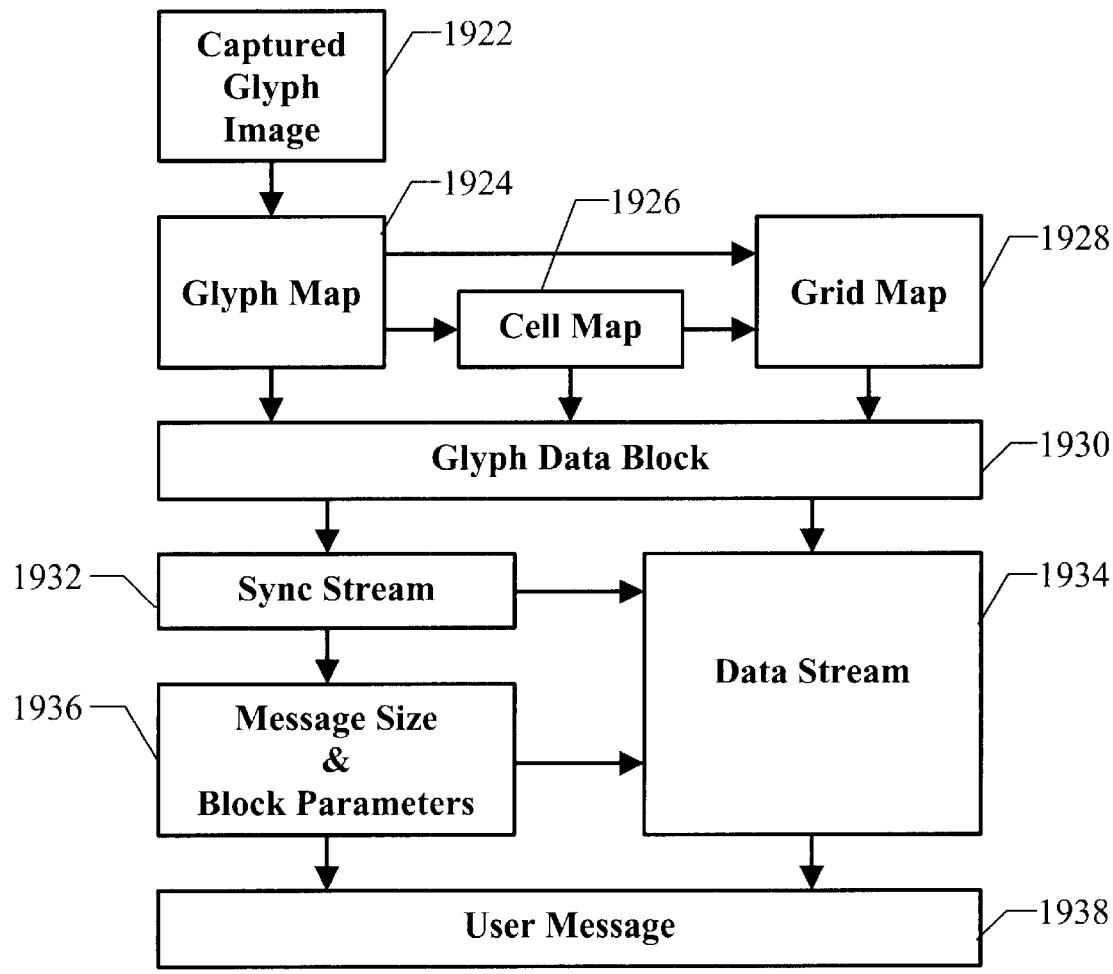
FIG. 19B illustrates an embodiment of the decoding technique in block form.

In more details. FIG. 19B illustrates an embodiment of the decoding technique. First, the glyph image 1922 is captured. A glyph map 1924 is created by pixel transformation. A cell map 1926 is created from the glyph map. A grid map 1928 is created based on both glyph map 1924 and cell map 1926. A main function of a glyph map is to filter out, i.e., identify, glyph cells. A main function of a cell map is to recover dimension and orientation. A main function of a grid map is to provide anchor points for cells. The anchor points are important since only those cells with logical value of 1 are evident in a glyph map. Glyph data block (data block) 1930 is created by mapping glyph map 1924, using the cell map 1926 and grid map 1928 as guide, from image domain to data domain. Sync stream 1932 is recovered by searching for symmetry and specific arrangements under various schemes from glyph data block 1930. By performing the associated error correction decoding, the message size and block parameters 1936 are recovered from the block tag embedded in the sync stream. The successful recovery of sync streams ascertains the correct locations and dimension of the data stream 1934. The user message is decoded when the message size and the block parameters are available to interpret the data stream.

Regarding colored pixels, in decoding glyph cells in color images, one can use a scheme that is similar to the decoding of grayscale glyph cells in the monocolor technique. Briefly, the technique involves finding whether a glyph pixel has a high contrast with the background pixel (i.e., whether the glyph pixel has a value that is different from that of the average background for more than half the maximum pixel value). In this decoding scheme, the absolute value difference in pixel value between the average background and the color glyph pixel GP is calculated and called "cell contrast ("CC")." To decode, the maximum value of the three color components of CC is found. In decoding, the bit logical value is 1 if the maximum (CC) is equal to or larger than 127, which is the average of the brightest and the dimmest pixel value in a color. The bit logical value is 0 if the maximum (CC) is less than 127.

As illustrative examples, FIG. 6B and FIG. 6D will shown how colored cells can be decoded. In FIG. 6B. GP is a blue pixel having a pixel value of (0, 0, 255) corresponding to the red, green and blue components. The background pixels BP1, BP2, BP3, BP4, BP6, BP7, BP8, and BP9 are yellow, each having a pixel value of (255, 255, 0). The average background pixel therefore has a pixel value of(255, 255, 0). CC therefore has a pixel value of (255, 255, 255). As to a result, the maximum (CC) is 255, indicating that the logical value of GP is 1. In FIG. 6D, GP is a red pixel having a pixel value of (255, 0, 0) corresponding to the red, green and blue components. The background pixels BP1, BP2, BP3, BP4, BP6, BP7, BP8, and BP9 are cyanic (i.e., blue green), each having a pixel value of (0, 255, 255). The CC therefore has a value of (255, 255, 255). Thus, the maximum (CC) is 255, indicating that the logical value of GP is 1. Other colored glyph cells can be decoded in an analogous manner. A person skilled in the art will understand that with such techniques of coding and decoding logical 0 and 1 using colors, the other features for embedding a message within a foreground visual image, as well as the features for retrieving the embedded message can be implemented with techniques similar to that for the grayscale embodiments as described above.

Multiple Block Visual Images

The present invention can be used to encode and decode visual images that span two or more blocks. For example, sometimes a message to be embedded is too large to be embedded into a single visual image. In this case, the message can be divided into a number of fractions and each can be embedded into a different visual image. These different visual images can be read and the embedded messages can be found and linked together to form the final, desired message. FIG. 14A illustrates schematically an embodiment of an image 1400 with an embedded message wherein both the visual image and the embedded message are divided into three contiguous parts 1401, 1402, 1403. Using the three blocks 1401, 1402, 1403, one can embed, for example, the message data: "http:\\www.glyph.com\serial_blocks.html" in the total image 1400. To this end, one can divide the message data into three blocks and embed each into a different image of the blocks 1401, 1402, 1403. Thus, one can embed the data "http:\\www.gl" in the first block 1401, the data "yph.com\seria" in the second block 1402, and the data "l_blocks.html" in the third block 1403. As a result, the first image, i.e., the first part (or block) 1401 of the total visual image 1400, shows "THREE" (FIG. 14B), the second image 1402 shows "BLOCK" (FIG. 14C), and the third image 1403 shows "IMAGE" (FIG. 14D), each with reversal pixels in the foreground image revealing the existence of an embedded message. By visual inspection, the three images in blocks 1401, 1402, 1403 show the total image "THREE BLOCK IMAGE" (see FIG. 14E). In each block, a tag section can be present to link the block with the other blocks. For example, the sync stream in the block can include the tag in the beginning, which is followed by the error correction stream. Similarly, the second block and the third also contain tag sections to link the blocks together. Once linked together in series, i.e., serially, the total message reads "http:\\www.glyph.com\serial_blocks.html".

Figure 14F:
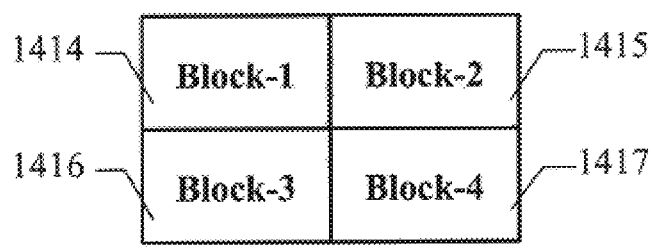
FIG. 14F shows a schematic representation of an embodiment of four parallel blocks.
Figure 14G:
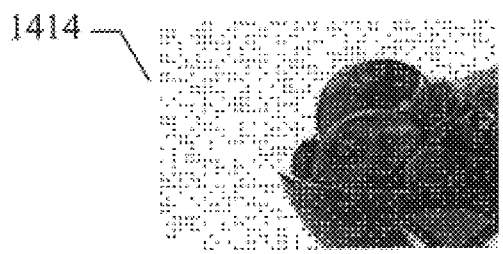
FIG. 14G to FIG. 14J show the individual blocks of the four parallel blocks of FIG. 14F.
Figure 14H:
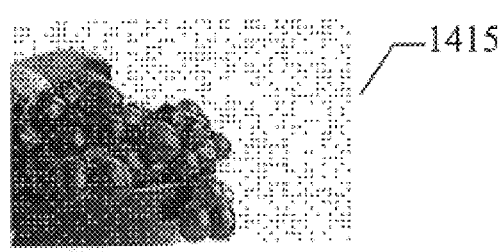
Figure 14I:
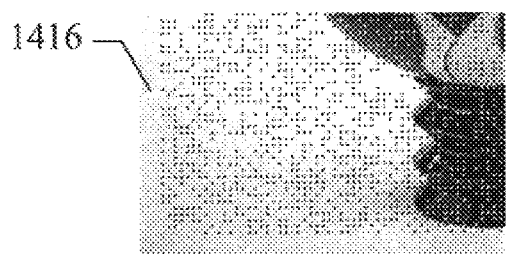
Figure 14J:
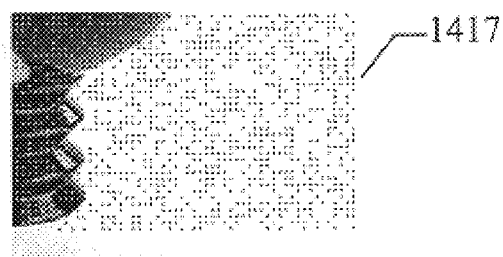

FIG. 14F shows embodiment in which blocks have parallel embedded messages, i.e., each block has the same embedded message, although the visual image of the individual blocks are distinct. For example, in the glyph block 1410 the overall foreground visual image (with embedded message) can be divided into four blocks: first block 1414, second block 1415, third block 1416, and fourth block 1417.

Figure 14K:
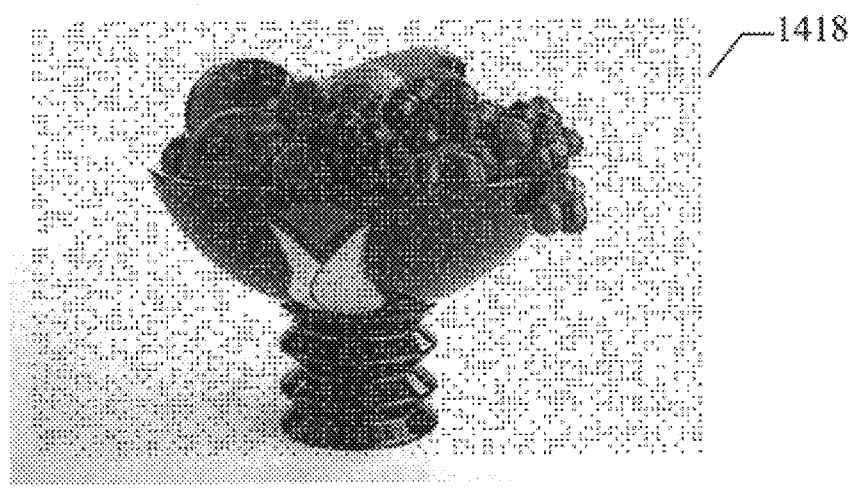
FIG. 14K is the overall image of the resulting block that consists of the parallel blocks of FIG. 14F.

FIG. 14G to FIG. 14J show the individual blocks of the four parallel blocks of FIG. 14F. FIG. 14K is the overall resulting block that consists of the parallel blocks of FIG. 14F. In this embodiment of parallel technique, the embedded message in each block 1414, 1415, 1416, 1417 is "http:\\www.glyph.com\tiled_glyph_blocks". Thus, there is a redundancy of information. Reading any one of the four blocks 1414, 1415, 1416, 1417 will provide the message "http:\\www.glyph.com\tiled_glyph_blocks". If there is any error in any one of the block, such as error caused by part of the glyph block 1410 being covered, the redundancy will enable the correction of the defective information to provide the accurate message. In each of the blocks is also a tag section indicating that these blocks are parallel blocks.

Further, several glyph blocks each with its separate foreground image and embedded message can be placed together as a way to present a meaningful related total foreground image with related embedded messages. As a further illustration, FIG. 15 shows an example of the codes of a HTML page 1500 containing four different hyperlinked URL addresses: (1) "http://www.netshopper.com/", (2) http://www.netshopper.com/computers.html", (3) "http://www.netshopper.com/monitors.html", and (4) "http://www.netshopper.com/printers.html". This would be an example of a web site for sale of computers and related products over the Internet. In a traditional web page encoded with the HTML program of FIG. 15, the hyperlinked display is typically projected on a monitor as the web page 1502 in FIG. 16. A person browsing the web page using a computer will only need to click with a pointer (e.g., a mouse) on, for example, the "Monitors" hotspot to cause the person's browser to connect to the web site "http://www.netshopper.com/monitors.html". The same HTML program of FIG. 15, can be encoded to be displayed, e.g., on a printed sheet of paper, as a web page 1504 shown in FIG. 17. In FIG. 17, each of the glyph blocks include a visual image embedded with a web address. Thus, in block 1506 the "Net Shopper" image is embedded with the message "http://www.netshopper.com/computers.html"; in block 1508 the "Computers" image is embedded with the message "http://www.netshopper.com/computers.html"; in block 1510 the "Monitors" image is embedded with the message "http://www.netshopper.com/monitors.html". In block 1512 the "Printers" image is embedded with the message "http://www.netshopper.com/printers.html". To connect to an Internet web site corresponding to one of the hotspots of FIG. 17, when one of the blocks 1506, 1507, 1508, 1510 is read with a reader in according with the present invention, the reader causes a processor (such as the computer) to cause a web browser to connect to the URL corresponding to the web site. Note that each of the block (hotspots) of FIG. 17 contains a clearly recognizable (readable by human eyes) foreground image with noticeable but not obtrusive dots revealing the presence of the embedded message (URL address). How big the blocks have to be depends on the quality of the printer and the reader. Generally nowadays, the present image sensor technology and printers (e.g., 600 dpi) permits for example, the image of FIG. 17 to be read as 12 point Time Romans font readily. With commercial offsite printing, much finer prints, and therefore smaller images that are needed to carry the same information, are possible.

The Process of Printing Embedded URLs of HTML Pages

Normally, the URLs of an HTML page are lost after the page is printed. With present technique, the URLs of an HTML page can still be present after the page is printed on paper. The process of printing embedded URLs with live hot spot on paper from a standard HTML page can be totally automatic and transparent to users. There are five steps in this process, briefly stated as follows. 1) Parse an HTML page to find all hot spots. 2) Find the location and the dimension of each hot spot. 3) Convert each hot spot into proper foreground image. 4) Encode the URL address associated with each hot spot into the relevant foreground image. 5) Print the URL embedded hot spots in place of regular hot spots on paper. There are three major advantages of this process. Firstly, HTML pages need not to be changed. Secondly, the layout of an HTML page is not altered. Thirdly, the random look dots appeared on hot spots signal the presence of embedded URLs.

Integration of Encoding, Printing of Image and Decoding

In the application using the present technique of encoding and decoding, a message (which is not generally decodable by visual inspection) is embedded in a foreground visual image in an unobtrusive way so as to not distort the visual image significantly. Generally, the visual image may be printed on a surface of a substrate, such as paper. The visual image with the embedded image can then be read, e.g., by scanning the image with a scanner, into a processor, such as an electronic computer, e.g., a personal desktop computer.

Figure 20A:
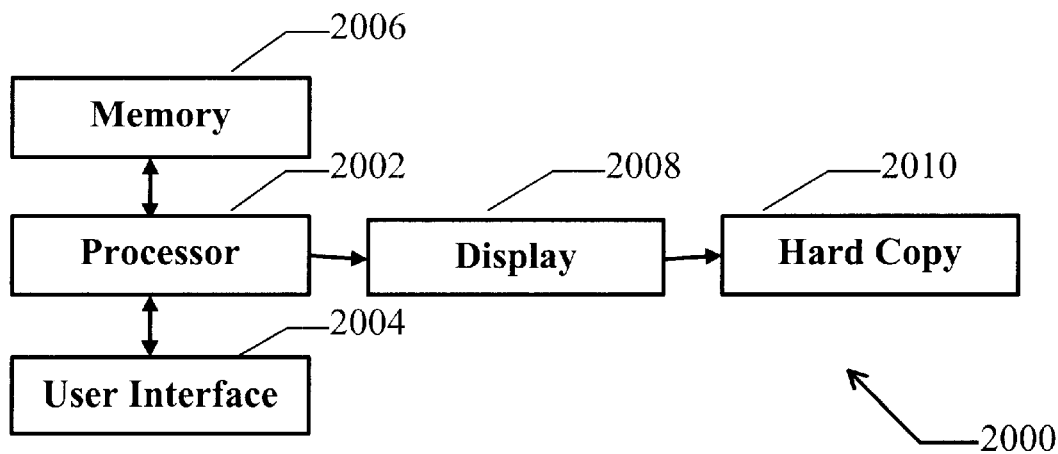
FIG. 20A shows an embodiment of an apparatus for encoding a message.

FIG. 20A shows an example of an apparatus for encoding a message into a visual image and displaying that visual image with the embedded message to be read. The encoding apparatus 2000 includes a processor 2002 which has the algorithm for encoding. The processor 2002 can be an electronic computer, microprocessor, and the like. The processor 2002 can contain the codes for encoding the visual image, as well as the embedded message in accordance with the technique of the present invention. A user interface 2004 is connected to the processor 2002 for inputting parameters, data, programs, modifications of programs and algorithms, message, edits of images, and the like, into the processor 2002. Examples of the user interface 2004 are keyboard, pointer device (e.g., mouse), light pen, voice activated input device, and the like. The processor 2002 itself can have memory for storing the algorithms, programs, data, etc., or a memory 2006 can be connected to the processor for such storage. The visual image with embedded message(s) can be displayed for visual viewing, as well as for importing into a reader by a display 2008. Example of the display 2008 include CRT monitor, liquid crystal display, printer, and the like. In the case of a printer, a hard copy 2010 with the visual image, which includes the embedded message, can be obtained by printing on a medium, such as paper. Optionally, a user interface 2004 can be connected to the display 2008 for controlling the display. Electrical connections can be done by means of cables, wires, and the like. Wireless connections between devices can also be done for signal transmission by, for example, electromagnetic waves, such as microwave, or infrared light signal transmission. An example of using this apparatus is to print on a piece of paper a visual image, e.g., the image "Webstar" that has the URL address "http:\\www.Webstar.com\" embedded therein.

Figure 20B:
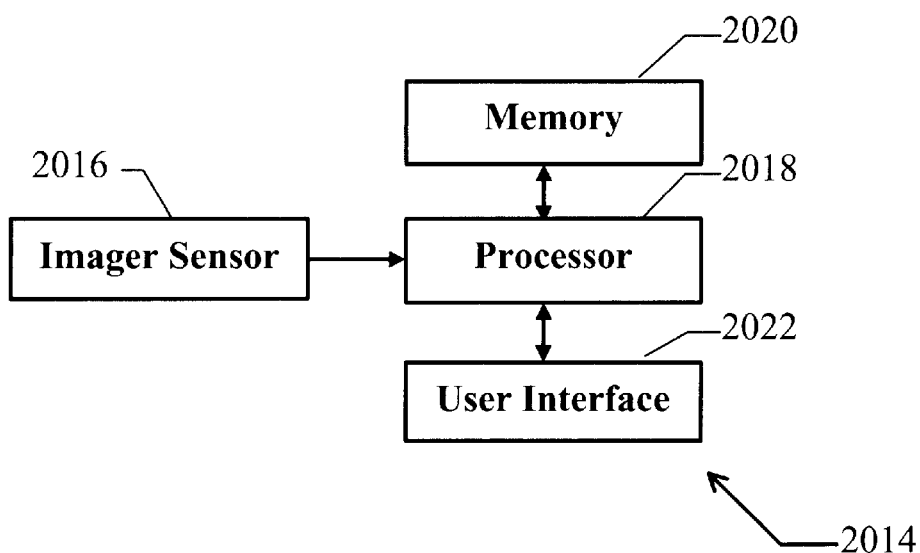
FIG. 20B illustrates an embodiment of a reader for reading the embedded message.

FIG. 20B illustrates an embodiment of a reader for reading the embedded message from the visual image, such as one displayed on the display 2008. The reader 2014 includes an imager 2016 which records the visual image displayed by the display. For example, if the display is a printer producing a hard copy, the imager 2016 can be any device, e.g., a scanner. CMOS sensor, or a charge coupled device CCD, which converts the pixels (i.e., image elements) into electrical signals. A processor 2018 converts the electrical signals into pixel values and into digital values of 0 and 1 to result in the data structure of a bitmap. The processor 2018 employs the algorithms for decoding the bitmap data into the sync stream, data stream, and eventually decoding the embedded message. The processor 2018 may have its own memory, or it may be connected to a memory 2020 for storage of data, parameters, programs, algorithms, and the like. The processor 2018 can be an electric computer, microprocessor, or the like. Optionally, a user interface 2022 can be used for inputting data, parameters, programs, edits, and the like into the processor 2018. Examples of the user interface include keyboards, pointer, light pen, voice activated input device, and the like. Also, optionally, a user interface 2022 can be connected to the imager 2016 for controlling the imager. The imager 2016 can further be a device that captures the bitmap image with a video pickup device such as a video camera, charge-coupled device, and the like. This is particularly applicable for capturing the image from a light emitting display, such as a CRT monitor. Imagers such as scanners, cameras, etc., are well-known in the art. For example, desk-top scanners and hand held scanners are commercially available and their technology is well known.

Figure 20C:
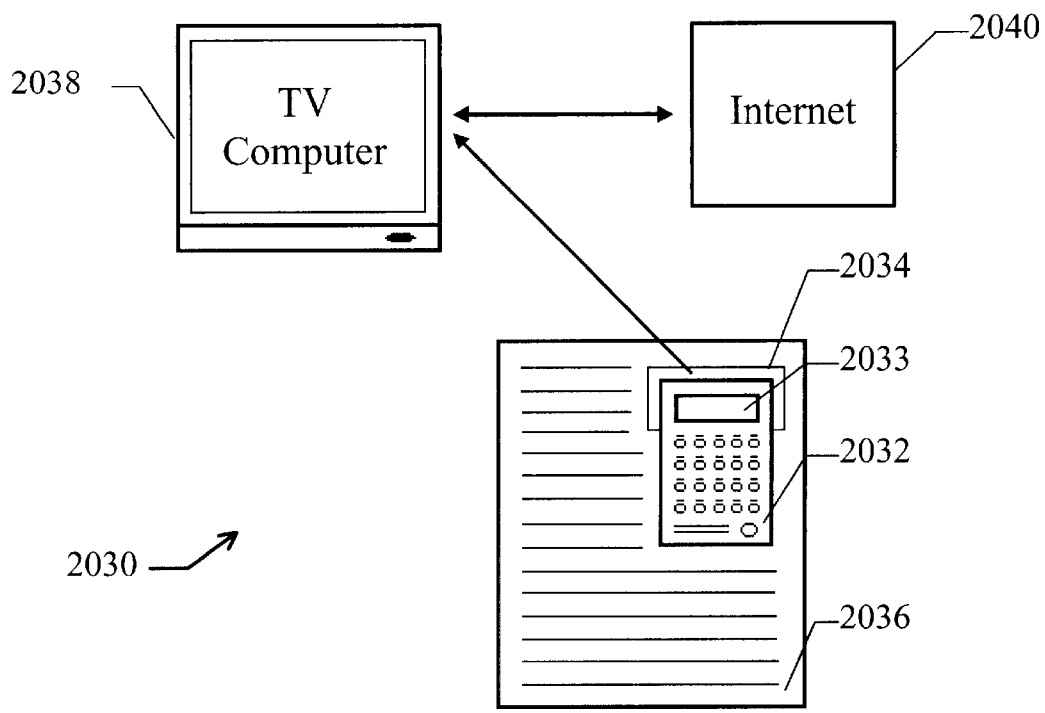
FIG. 20C depicts an embodiment of the present invention for decoding a printed image with an embedded URL address.

FIG. 20C depicts an embodiment of the present invention for decoding a printed image with an embedded URL address and activating a computer to direct a web browser to access the web site according to the URL address. In this embodiment of an Internet access system 2030, a remote control reader 2032 can read the embedded URL from a printed image 2034 from a printed page 2036 and remotely communicate that information to a TV/computer 2038, which is connect by a server to the Internet 2040. The remote control reader 2032, for example, has a LCD display 2033 displaying the decoded embedded message. The present remote controller has an image sensor (or imager) 2016 and can function as the reader 2014 of FIG. 20B. Furthermore, the computer 2038 can actually be a processor in a TV set with access to Internet. The remote control reader 2032 can be a remote controller for the TV set with additional features for reading coded message in an image as described herein. Typically, a remote control reader would have a battery for energy supply and a transmitter for transmitting signals of electromagnetic waves to the computer. Additionally, a pointer device, such as a mouse can also be incorporated in the remote control reader 2032 to provide control over the computer to run regular computer software and programs. Technologies on traditional remote control, Internet connection, web browsing, and pointers are known in the art and will not be described in detail here.

Figure 20D:
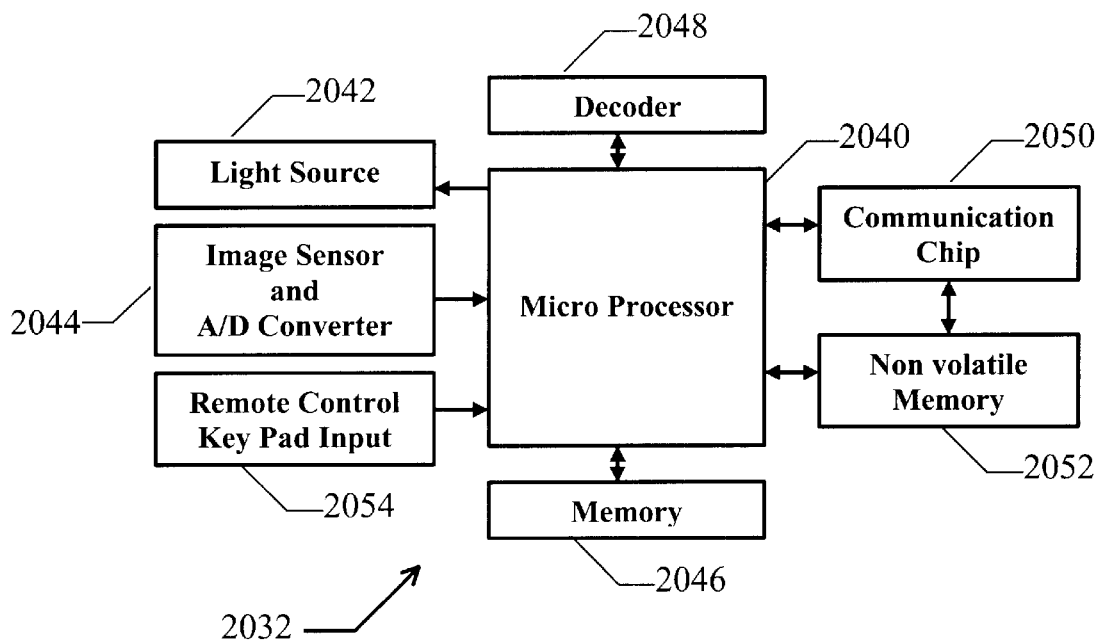
FIG. 20D schematically illustrates the structure of a reader.

FIG. 20D schematically illustrates the structure of the remote control reader 2032. Briefly stated, the remote control reader has a microprocessor 2040 which controls the communication operation and data processing. A remote control key pad inputs information to the microprocessor 2040, for example, to initiate the switching on or off of a light source 2042 for illumination of the image 2034 on the printed page 2036. A light sensor (such as a CCD camera, CMOS camera, photodetectors array, scanner) and A/D converter (block 2044) produces digital electrical signals dependent on the light intensity (and optionally color in the case of a color camera) of light impinging on the light sensor. The processor 2040 can have a memory 2046 connected to it for storing information, data, program, etc. A decoder 2048 provides the decoding of the signal received by the microprocessor 2040 from the A/D converter to identify the URL address. The decoder 2048 contains the program of algorithms for decoding the visual image to derive the message embedded in the visual image. The URL address is communicated to the computer 2038 via the communication chip 2050. The communication chip 2050 and the microprocessor 2040 are in communication with a nonvolatile memory in the remote control reader 2032. The nonvolatile memory 2032 provides data storage capacity for reading an embedded URL address from an image on a printed page far away from the computer 2038. The remote control reader 2032 can be brought close to the computer 2038 later for activating the access of a web browser to the URL address. Thus, for example, when the remote control reader 2032 reads a visual image "Webstar" with the embedded URL address of FIG. 8A, it transmits data to the computer 2038 to activate the web browser to access the web site with URL address "http:\\www.Webstar.com\".

An Internet accessing apparatus according to the present invention can decode an image having an embedded Internet address to connect to the Internet. As used herein, the term "Internet" includes the world wide web, and also includes network to web sites whose access is available only to certain authorized users. Regardless of the extent of availability, the present invention is applicable for an authorized users to access any such sites by reading the web site address from an image with an embedded address. The microprocessor 2040 in the remote control reader 2032 can be set such that the decoded web-site address is immediately and automatically called by the computer 2038 to connect to the appropriate site through the Internet. Alternatively, the web site can be stored as it is read by the remote control reader 2032 and later used to call up the appropriate address. The operation of the remote control reader is analogous to a person using a mouse to click on the monitor screen a hotspot, i.e., hyperlinked web site, to activate the connection to that hyperlinked site. The difference is that instead of using a mouse (or other pointer devices) to click a hyperlinked site on a screen, in the present web-site decoder, the user uses the remote control reader 2032 to read or scan the hotspot in the image with the embedded web-site address.

Figure 21A:
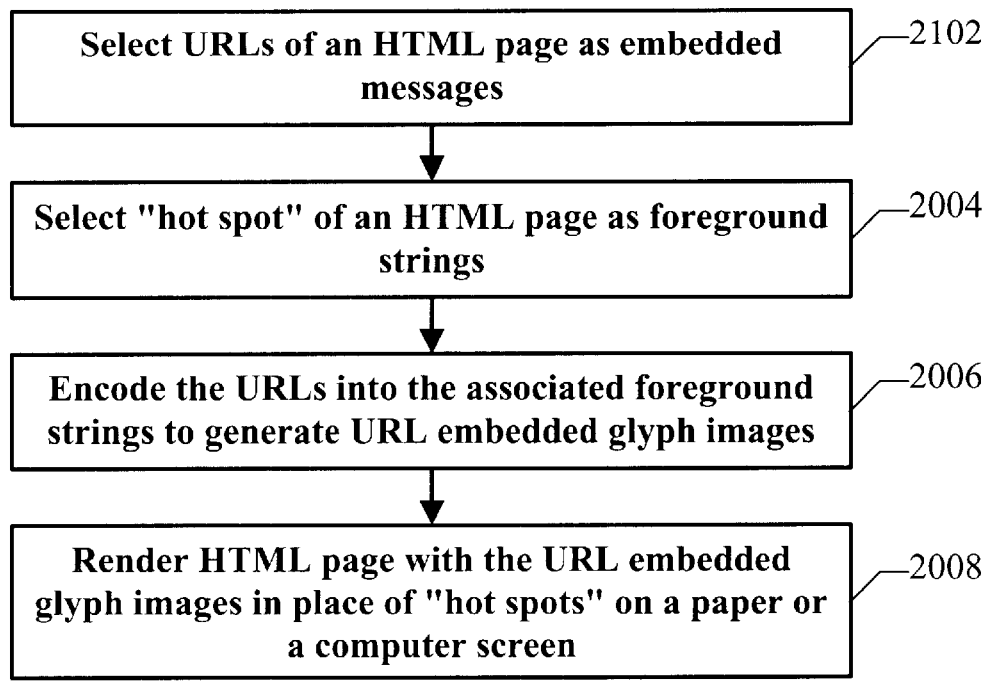
FIG. 21A shows a flow chart depicting how a URL address is embedded in a glyph image.

The encoding apparatus 2000 and reader 2014 and similar equipment can be used to encode and decode according to the techniques described above. FIG. 21A shows a flow chart briefly depicting how a URL address (the message) is embedded in a glyph image and displayed. First, a URL of an HTML page is selected as a message to be embedded (block 2102). For example, to embed a remote link to a web site "Webstar" one may want to embedded the message "http:\\www.webstar.com\". Also, the hot spot of the HTML page is selected as the foreground strings (block 2004). For example, the visual image in which the message may be embedded can be the image "Webstar". Next, the URL address is encoded to embed in the foreground strings (visual image) to generate a glyph image (block 2006). The glyph image is displayed (block 2008), e.g., by printing on paper or shown on a computer monitor screen instead of the regular hotspot. A printer, for example, can be used to print a hard copy of the URL address embedded image on paper.

Figure 21B:
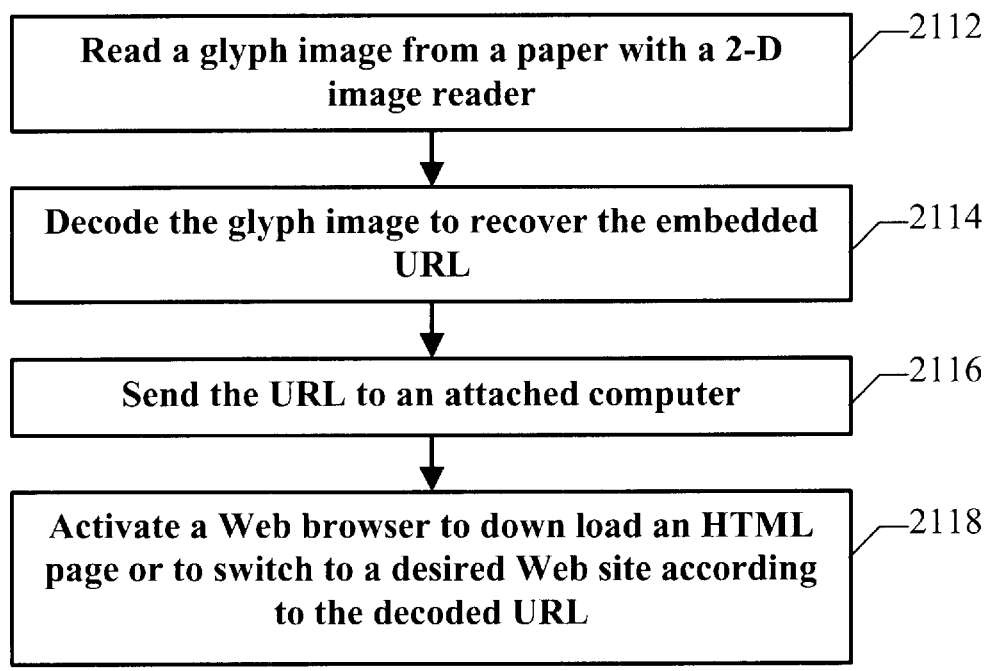
FIG. 21B shows a flow chart depicting how a URL address is decoded from a glyph image.

To read the embedded URL address from the glyph image, the process is briefly depicted in the flow chart of FIG. 21B. A displayed glyph image, e.g., one printed on paper is read by a 2-dimensional reader, e.g., the remote controller reader 2032 of the present invention (block 2112). The glyph image is decoded to recover the embedded message data (block 2114). Optionally, the information may be sent to a computer immediately to respond to the embedded message that has been decoded (block 2116). For example the reader may activate a web browser to download the HTML page or to switch to the desired web site according to the decoded embedded message, i.e., the web site URL address.

The present invention has been described in the foregoing specification. The preferred embodiment is for illustrative purpose only and is not to be interpreted as unduly limiting the scope of the invention. It is to be understood that modifications and alterations of the invention, will be apparent to those skilled in the art without departing from the scope of the invention. For example, the algorithms or programs can reside in the remote control reader, in the TV/computer, in a program storage medium, such as a floppy disk, hard disk, tape, compact disk, etc.

What is claimed is:

1. A method for two dimensional encoding a message, comprising:
    (a) providing a block of pixels to show a message stream representing the message;
    (b) dividing the pixels into tiles of cells such that substantially all of the tiles having the same number of data cells, and dividing the data cells to include a first group and a second group to show a message stream, such that data cells can be located generally over the block of pixels or a portion thereof and
    (c) representing the bit values of the message stream such that a bit of the message stream is represented by the relationship between a binary value of a cell of the first group and the binary value of a cell of the second group.

2. The method according to claim 1 wherein a bit of the message stream is represented by the relationship between a binary value of a cell of the first group and the binary value of a cell of the second group about a geometric center point of the block of pixels.

3. The method according to claim 2 wherein the binary values of the cells of the first group are the inverse of the cells of the second group.

4. The method according to claim 2 wherein the first group is geometrically symmetric to the second group about the geometric center point.

5. The method according to claim 1 wherein pixels in the block of pixels are divided into data cells and synchronization cells, the synchronization cells containing logical data indicating how the factual data are to be interpreted based on the position of the data cells.

6. The method according to claim 1 wherein pixels in the block of pixels are divided into data cells and synchronization cells wherein the synchronization cells are structured to have a first synchronization portion and a second synchronization portion backward in cell order to the first synchronization portion so as to be in symmetry therewith about a center point in the block of pixels.

7. The method according to claim 1 wherein pixels in the block of pixels are divided into data cells and synchronization cells wherein the synchronization cells interleave the data cells substantially throughout the two dimensional pattern of pixels.

8. A device for decoding a two dimensional encoded message in a pattern of pixels, comprising:
  (a) reader for receiving light from a pattern of pixels and determining pixel values of pixels in the pattern of pixels; and
  (b) processor having a program of code means readable by the processor to recover an embedded message from the pattern of pixels, wherein the pixels are divided into tiles of cells, substantially all the tiles having a synchronization cell neighbored by a plurality of data cells; the data cells for containing factual data for the embedded message and the synchronization cells containing meaningful logical data indicating how the factual data are to be interpreted based on the position of the data cells; the synchronization cells substantially interleaving the data cells throughout the two dimensional pattern of pixels, the program comprising:
    (i) code means for utilizing the synchronization cells to determine the location of the data cells; and
    (ii) code means for determining the embedded message based on pixel values of the data cells.

9. The device according to claim 8 wherein the program comprises code means determines a web-site address by determining binary values based on the pixel values for pixels from the pattern of pixels; and the program further comprises code means for loading the web-site address onto a web browser for connecting to the web-site according to the web-site address.

10. The device according to claim 8 wherein the code means for utilizing the synchronization cells determines a synchronization stream having a cell-order forward synchronization portion and a cell-order backward synchronization portion in symmetry therewith.

11. The device according to claim 8 wherein the data cells can be located generally over the block of pixels or a portion thereof.

12. A method for two dimensional coding of message, comprising:
  (a) providing a block of pixels to show a foreground image with an embedded message; and
  (b) dividing the pixels into tiles of cells, substantially all the tiles having a synchronization cell neighbored by a plurality of data cells; the data cells for containing factual data for the embedded message and the synchronization cells containing logical data indicating how the factual data are to be interpreted based on the position of the data cells; the synchronization cells substantially interleaving the data cells throughout the two dimensional pattern of pixels.

13. The method according to claim 12 wherein the synchronization cells represent synchronization comprising a synchronization stream having a cell-order forward synchronization portion and a cell-order backward synchronization portion in symmetry therewith.

14. The method according to claim 12 wherein the pixels in the block of pixels have binary values and the binary values of the synchronization cells and data cells can vary such that the embedded message does not obtrusively distort the foreground image and such that there is no optically readable two dimensional reference structure.

15. A method for two dimensional coding of message, comprising:
  (a) providing a block of pixels to show a foreground image with an embedded message; and
  (b) dividing the pixels into tiles of cells, substantially all the tiles having a synchronization cell neighbored by a plurality of data cells; the data cells for containing factual data for the embedded message and the synchronization cells containing logical data indicating how the factual data are to be interpreted based on the position of the data cells; the synchronization cells substantially interleaving the data cells throughout the two dimensional pattern of pixels, the synchronization cells representing synchronization that comprises a synchronization stream having a forward synchronization portion and a backward synchronization portion in symmetry therewith; wherein the pixels in the block of pixels have binary values and the binary values of the synchronization cells and data cells can vary such that the embedded message does not obtrusively distort the foreground image and such that there is no optically readable two dimensional reference structure.

* * * * *